US012103889B2

(12) United States Patent
Deng et al.

(10) Patent No.: US 12,103,889 B2
(45) Date of Patent: Oct. 1, 2024

(54) METHODS FOR ETCHING GLASS-BASED SUBSTRATES

(71) Applicant: CORNING INCORPORATED, Corning, NY (US)

(72) Inventors: Huayun Deng, Painted Post, NY (US); Melanie Lian Geiger, Horseheads, NY (US); Richard Allen Hayes, Beaumont, TX (US); Mingqian He, Horseheads, NY (US); Yuhui Jin, Painted Post, NY (US); Govindarajan Natarajan, Poughkeepsie, NY (US); Weijun Niu, Painted Post, NY (US); Brian Paul Usiak, Painted Post, NY (US); David Lee Weidman, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/893,398

(22) Filed: Aug. 23, 2022

(65) Prior Publication Data
US 2023/0064818 A1 Mar. 2, 2023

Related U.S. Application Data

(60) Provisional application No. 63/236,882, filed on Aug. 25, 2021.

(51) Int. Cl.
C03C 15/00 (2006.01)
(52) U.S. Cl.
CPC .................................. C03C 15/00 (2013.01)
(58) Field of Classification Search
None
See application file for complete search history.

(56) References Cited

U.S. PATENT DOCUMENTS

| 4,483,700 A | 11/1984 | Forker et al. |
| 5,674,790 A | 10/1997 | Araujo |
| 6,071,374 A * | 6/2000 | Kim ..................... C03C 15/00 239/536 |

(Continued)

FOREIGN PATENT DOCUMENTS

| CN | 1766701 A | 5/2006 |
| CN | 100516986 C | 7/2009 |

(Continued)

OTHER PUBLICATIONS

Hajian, et al. "On the porosification of LTCC substrates with sodium hydroxide", Composites Part B, vol. 157, 2019, pp. 14-23.

(Continued)

Primary Examiner — Shamim Ahmed
(74) Attorney, Agent, or Firm — William J. Tucker

(57) ABSTRACT

Glass-based substrates are described herein that may be processed by methods including applying a cover article onto a glass-based substrate, submerging the glass-based substrate in an etchant, and maintaining the submersion of the glass-based substrate in the etchant. The glass-based substrate may include a covered surface portion and an exposed surface portion. At least a portion of the covered surface portion may be in direct contact with the cover article. The covered surface portion may not be in contact with the etchant and the exposed surface portion may be in direct contact with the etchant. The etchant may contact the exposed surface portion and the cover article for a time sufficient to etch the exposed surface portion. The cover article may provide a barrier between the etchant and the covered surface portion for the entirety of the submerging.

19 Claims, 10 Drawing Sheets

(56) References Cited

U.S. PATENT DOCUMENTS

| | | | |
|---|---|---|---|
| 6,136,371 A * | 10/2000 | Fidan | C09J 7/21 |
| | | | 118/325 |
| 6,709,316 B1 * | 3/2004 | Sun | C09G 1/02 |
| | | | 438/692 |
| 7,666,511 B2 | 2/2010 | Ellison et al. | |
| 9,758,261 B1 | 9/2017 | Steinfeldt | |
| 2001/0010370 A1 | 8/2001 | Kimura et al. | |
| 2006/0091392 A1 | 5/2006 | Lee et al. | |
| 2009/0142568 A1 | 6/2009 | Dejneka et al. | |
| 2011/0201490 A1 | 8/2011 | Barefoot et al. | |
| 2011/0225816 A1 | 9/2011 | Chou et al. | |
| 2013/0112653 A1 * | 5/2013 | Jang | C03C 15/00 |
| | | | 156/345.19 |
| 2014/0227523 A1 | 8/2014 | Dejneka et al. | |
| 2016/0102010 A1 | 4/2016 | Beall et al. | |
| 2017/0006699 A1 * | 1/2017 | Mizutani | H05K 1/113 |
| 2019/0300422 A1 | 10/2019 | Guo et al. | |
| 2020/0002224 A1 | 1/2020 | Carleton et al. | |
| 2020/0156990 A1 * | 5/2020 | Sakade | C09K 13/00 |
| 2020/0361811 A1 * | 11/2020 | Hevner | C04B 41/5353 |
| 2020/0361812 A1 * | 11/2020 | Jin | C03C 21/002 |
| 2020/0377406 A1 * | 12/2020 | Fahey | C03C 21/002 |
| 2020/0407274 A1 * | 12/2020 | Agnello | C03C 15/00 |
| 2021/0017068 A1 * | 1/2021 | Torfs | C03C 17/28 |
| 2021/0028003 A1 | 1/2021 | Lam et al. | |

FOREIGN PATENT DOCUMENTS

| | | |
|---|---|---|
| CN | 104198558 A | 12/2014 |
| CN | 105047742 A | 11/2015 |
| CN | 105126758 A | 12/2015 |
| CN | 103456804 B | 4/2016 |
| CN | 107290331 A | 10/2017 |
| CN | 112103278 A | 12/2020 |
| CN | 112114016 A | 12/2020 |
| JP | 2001-250958 A | 9/2001 |
| JP | 2014-111515 A | 6/2014 |
| JP | 2014-234422 A | 12/2014 |
| KR | 10-1766669 B1 | 8/2017 |
| WO | 2020/060955 A1 | 3/2020 |
| WO | 2020/232039 A1 | 11/2020 |
| WO | 2020/236498 A1 | 11/2020 |
| WO | 2020/243211 A1 | 12/2020 |
| WO | 2021/006043 A1 | 1/2021 |

OTHER PUBLICATIONS

International Search Report and Written Opinion of the International Searching Authority; PCT/US2022/040997; dated Nov. 30, 2022; 11 pages; European Patent Office.

* cited by examiner

METHODS FOR ETCHING GLASS-BASED SUBSTRATES

CLAIM OF PRIORITY

This application claims the benefit of priority under 35 U.S.C. § 119 of U.S. Provisional Application No. 63/236,882, filed on Aug. 25, 2021, the contents of which are relied upon and incorporated herein by reference in their entirety.

CROSS-REFERENCE TO RELATED APPLICATION

This application shares some common subject matter with the co-filed U.S. Provisional Patent Application No. 63/236,925, filed on Aug. 25, 2021, the contents of which are incorporated by reference herein in their entirety.

BACKGROUND

Technical Field

The present specification generally relates to glass-based articles and, more specifically, to methods for processing glass-based articles that include etching such glass-based articles.

Technical Background

Portable electronic devices, such as, smartphones, tablets, and wearable devices (such as, for example, watches and fitness trackers) continue to get smaller and more desirable to end consumers. As such, materials that are conventionally used on at least one external surface of such portable electronic devices also continue to evolve. For instance, as portable electronic devices get smaller and thinner to meet consumer demand, the display covers and housings used in these portable electronic devices serve multiple functions and cover multiple components, such as a display, cameras, and sensors, each of which may require different surface properties for optimum functionality.

Accordingly, a need exists for materials with different surface properties, and methods of producing such materials.

SUMMARY

According to one embodiment, a glass-based substrate may be processed by a method comprising applying a cover article onto a glass-based substrate, submerging the glass-based substrate in an etchant, and maintaining the submersion of the glass-based substrate in the etchant. The glass-based substrate may comprise a covered surface portion and an exposed surface portion. At least a portion of the covered surface portion may be in direct contact with the cover article. The covered surface portion may not be in contact with the etchant and the exposed surface portion may be in direct contact with the etchant. The etchant may contact the exposed surface portion and the cover article for a time sufficient to etch the exposed surface portion. The etchant may have a pH of at least 10 and a temperature of at least 95° C. during at least a portion of the contacting of the etchant with the exposed surface portion and the cover article. The cover article may provide a barrier between the etchant and the covered surface portion for the entirety of the submerging.

According to another embodiment, a glass-based substrate may be produced by one or more of the methods disclosed herein, wherein the glass-based substrate comprises an etched surface portion and a non-etched surface portion.

Additional features and advantages of the etched glass-based substrates and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
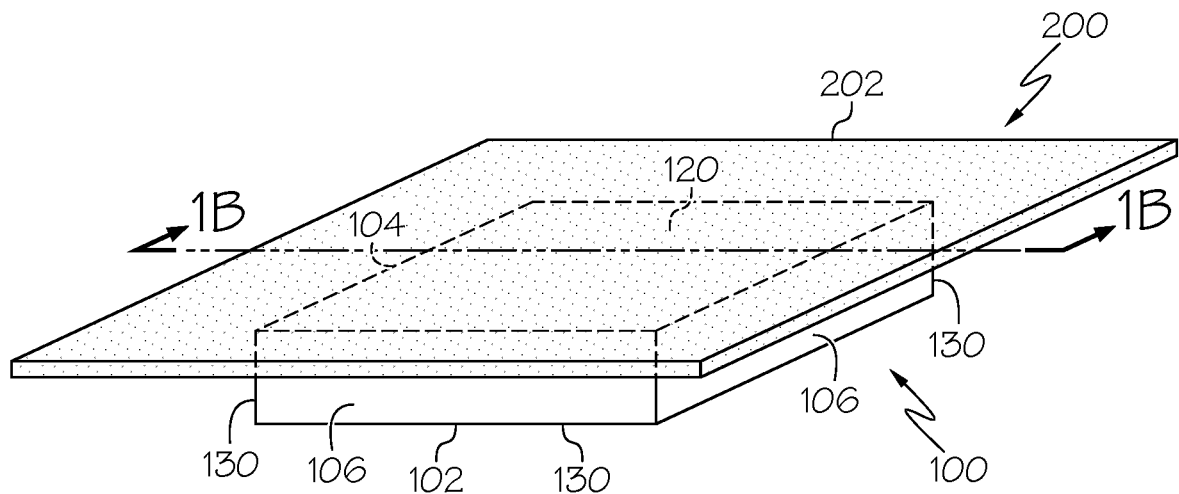
FIG. 1A schematically depicts a perspective view of an embodiment for etching only a portion of a glass-based substrate, according to one or more embodiments shown and described herein.

Reference will now be made to methods for processing glass-based substrates (sometimes also referred to herein as "glass-based articles"), as well as glass-based substrates produced by the methods disclosed herein. In the methods described herein, a portion of a glass-based substrate undergoes etching by contact with a basic etchant. The etchant contacts only a portion of the glass-based substrate (referred to sometimes herein as the "exposed surface portion" of the glass-based substrate) such that another portion of the glass-based substrate is not contact by the etchant (referred to sometimes herein as the "covered surface portion" of the glass-based substrate). To achieve such etching on only a portion of the glass-based substrate, a cover article is positioned on the glass-based substrate. The cover article serves to provide a barrier between the etchant and the covered surface portion. The cover articles provides a barrier by not permitting the transmission of the etchant. As such, only desired areas of the glass-based substrate are etched by the basic etchant. Following etching, the exposed surface portion corresponds to the etched portion of the glass-based substrate and the covered surface portion corresponds to the non-etched portion of the glass-based substrate.

As is described herein, the material of the cover article is selected such that it may provide for the barrier throughout the etching process, which may include relatively severe conditions such as an etchant having a pH of at least 10 and a temperature of at least 95° C. Only particular materials are suitable for protecting the covered surface portion from the etchant, as is described herein. Such materials may be different from those suitable for masking materials from conventional etchants such as hydrofluoric acid.

According to some embodiments, the etching procedures described herein may be utilized to form a textured glass-based article that is a glass-based sheet where one side is textured and the opposing side is untextured (i.e., having the relatively smooth surface native to many glass sheets, especially fusion drawn glass sheets). Textured glass-based articles may be produced utilizing a variety of processes, such as wet chemical etching techniques and abrasion combined with etching techniques. The low haze glass-based articles suitable for use as display covers may be produced by conventional techniques that combine sandblasting and hydrofluoric (HF) acid etching processes. However, the use of hydrofluoric acid presents significant safety and environmental challenges.

In one or more embodiments, the processes described herein are capable of producing glass-based articles with surface, optical, and mechanical properties equivalent to those produced by an HF acid etching process while also exhibiting a desirable manufacturing throughput capability. Additionally, such processes, utilizing basic etchants, may be performed only on certain desired portions of the glass-based substrates (e.g., only one side of a glass sheet). The processes may be relatively fast and may produce a substantially uniform surface. In addition, the processes described herein do not utilize HF acid, and thereby avoid the safety and environmental risks associated with HF acid.

In embodiments described herein, the glass-based substrate may be subjected to additional steps besides etching, such as applying the cover article to the glass-based substrate, abrading the exposed portion of the glass-based substrate, removing the cover article, and/or ion-exchanging the glass-based substrate. However, it should be understood that these steps are optional, and may not be present in all embodiments presently described herein.

Figure 9:
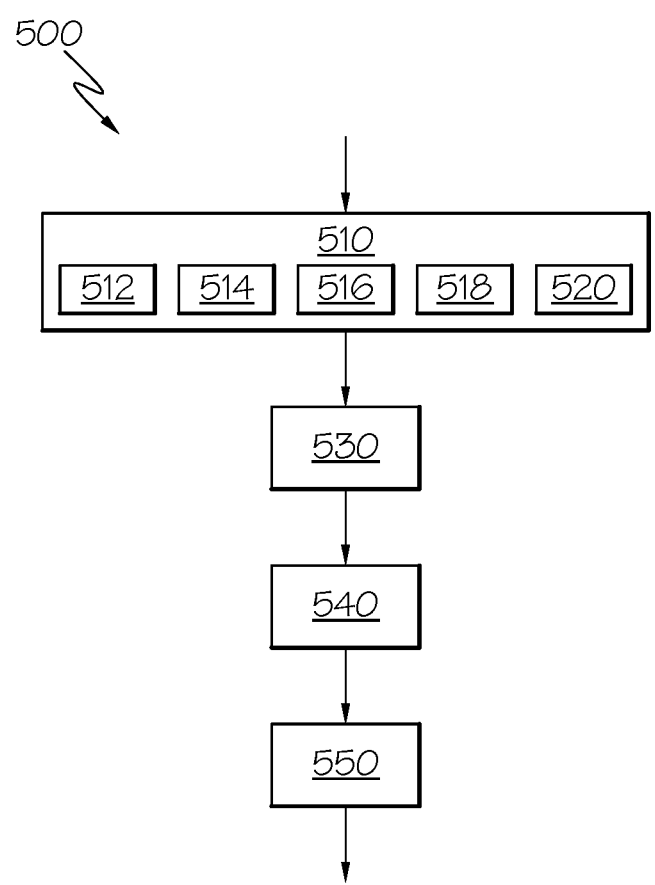
FIG. 9 shows a schematic flow diagram of a method for processing a glass-based article, according to one or more embodiments shown and described herein.

FIGS. 1A-7B depict various embodiments of cover article positioning on glass-based substrates. However, it should be understood that the presently disclosed methods are not limited to these embodiments. Moreover, FIG. 9 depicts a flow-chart of the steps of the disclosed processes. It should be understood that not all steps depicted in FIG. 9 are always necessary. Referring to FIG. 9, the processing method 500 comprises step 510 of applying the cover article to the glass-based substrate. In step 510, the arrangement of the cover article may vary, such as shown as the application of the cover article by steps 512, 514, 516, 518, and 520. Step 512 utilizes the cover article of FIGS. 1A and 1B. Step 514 utilizes the cover article of FIGS. 2A and 2B. Step 516 utilizes the cover article of FIGS. 3A and 3B. Step 518 utilizes the cover article of FIGS. 4A and 4B. Step 520 signifies other cover article application embodiments not explicitly depicted in FIGS. 1A-7B. Only one of step 512, 514, 516, 518, and 520 are generally utilized in step 510. Following the cover article application in step 510, the cover article may be abraded in step 530, as is disclosed herein. It should be understood that step 530 is optional. In the next step 540, the glass-based substrate with the applied cover article is etched by submersion in basic etchant, as is described in detail herein. In step 550, the cover article is removed from the glass-based substrate. Further processing steps or sub-steps of steps numbered in FIG. 9 may not be depicted in FIG. 9 but are also contemplated, as is discussed herein. For example, various steps to remove the cover article from the glass-based substrate may be included in the processes described herein.

As described herein, the term "glass-based substrate" or "glass-based article" refers to any article that includes glass, such as a glass or glass-ceramic material. For example, a glass-based article may be a laminated material where at least one laminate layer includes a glass or glass-ceramic. The glass-based substrates may have any suitable composition. The composition of the glass-based substrates influences the etching rate. Selecting glass-based substrates that exhibit fast etch rates increases manufacturing throughput.

In embodiments, the glass-based substrates may include a glass ceramic. Exemplary glass ceramic materials are those described in U.S. Patent App. Pub. No. 2016/0102010 A1, titled "High Strength Glass-Ceramics Having Petalite and Lithium Silicate Structures," published Apr. 14, 2016, the contents of which are incorporated herein by reference in their entirety.

In additional embodiments, the glass-based substrates may include an alkali aluminosilicate glass, such as a lithium aluminosilicate glass. Exemplary lithium aluminosilicate glass materials are those described in U.S. Patent App. Pub. No. 2019/0300422 A1, titled "Glasses Having High Fracture Toughness," published Oct. 3, 2019, the contents of which are incorporated herein by reference in their entirety. Additionally or alternatively, the glass-based substrates may include an alkali aluminosilicate that is substantially free or free of lithium. Exemplary alkali aluminosilicate glass materials that are substantially-free or free of lithium are those described in U.S. Patent App. Pub. No. 2009/0142568 A1, titled "Glasses Having Improved Toughness and Scratch Resistance," published Jun. 4, 2009, U.S. Patent App. Pub. No. 2009/0142568 A1, titled "Glasses Having Improved Toughness and Scratch Resistance," published Jun. 4, 2009; U.S. Patent App. Pub. No. 2014/0227523 A1, titled "Zircon Compatible, Ion-exchangeable Glass With High Damage Resistance," published Aug. 14, 2014; and U.S. Patent App. Pub. No. 2011/0201490 A1, titled "Crack And Scratch Resistant Glass And Enclosures Made Therefrom," published Aug. 18, 2011, the contents of each of which are incorporated herein by reference in their entirety. According to additional embodiments, the glass-based substrate may include an alkaline earth aluminosilicate glass.

In one or more embodiments, the etching procedure may comprise submerging the glass-based substrate in an etchant, and maintaining the submersion of the glass-based substrate in the etchant. As is described in detail herein, a cover article may be applied onto a portion of the glass-based substrate such that the etchant cannot contact certain desired portions of the glass-based substrate when submerged. The etchant may contact the exposed surface portion and the cover article for a time sufficient to etch the exposed surface portion to a desired degree. In such embodiments, the glass-based substrate may comprise or consist of a covered surface portion and an exposed surface portion (which is etched). In general, the cover article contacts the glass-based substrate around at least the perimeter of the covered surface portion of the glass-based substrate (i.e., the area of the glass-based substrate that does not contact the etchant and is not etched). However, as is described in some embodiments, the cover article does not need to contact the entire covered surface portion of the glass-based substrate.

Now referring to FIGS. 1A-7B, embodiments of cover articles 200 positioned on glass-based substrates are depicted. In each embodiment, the glass-based substrate 100 is a glass sheet that includes a major surface 102 and major surface 104 opposite the major surface 102. The distance between the major surface 102 and the major surface 104 defines the thickness of the glass-based substrate 100. The glass-based substrate 100 also includes edges 106, which define the perimeter of the glass-based substrate 100 and have a width equal to the thickness of the glass-based substrate 100. According to various embodiments, the glass-based substrate 100 may have a length to thickness ratio of at least 10, at least 100, at least 500, or even at least 1000. While the embodiments of FIGS. 1A-7B show sheet shaped glass-based substrates 100, it is contemplated that other substrate shapes may utilize the processes presently described.

In the embodiments of FIGS. 1A-7B, a cover article 200 is positioned over and in direct contact with at least a portion of the covered portion 120 of the glass-based substrate 100. Generally, the cover article 200 covers the covered surface portion 120 of the glass-based substrate 100, while the exposed surface portion 130 is not covered by the cover article 200. In such embodiments, the covered surface portion 120 does not contact the etchant since the cover article 200 forms a barrier between the etchant and the covered surface portion 120. However, the etchant contacts the exposed surface portion 130 when the glass-based substrate 100 is submerged in the etchant. Such embodiments may be useful for subjecting only one side of glass sheet to etching. This concept may be better understood through the embodiments of FIGS. 1A-7B, described in further detail herein. However, it should be understood that other positionings of cover articles 200 are contemplated besides those discloses by FIGS. 1A-7B.

Figure 1B:
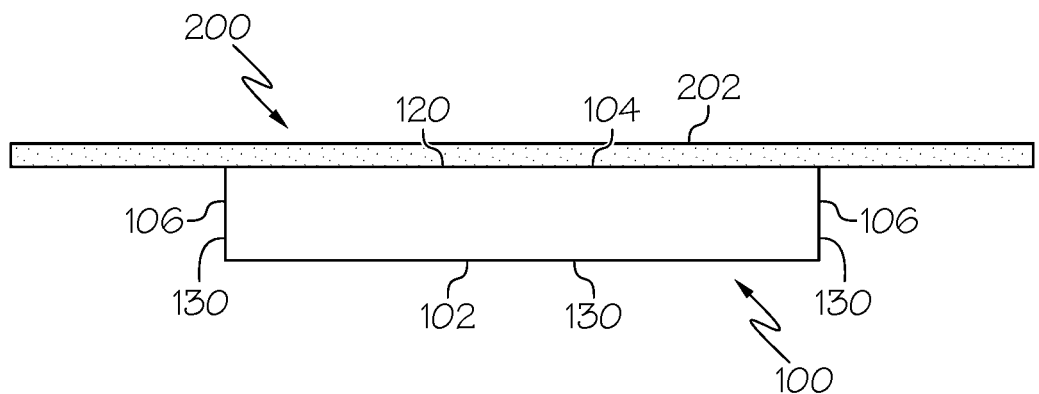
FIG. 1B schematically depicts a cross-sectional view of the embodiment of FIG. 1A, according to one or more embodiments shown and described herein.

Now referring to FIGS. 1A and 1B, a first embodiment of a cover article 200 comprising a film 202 on a glass-based substrate 100 is depicted. The film 202 may be in contact with the entirety of a major surface 104 of the glass-based substrate 100. In such embodiments, the entire major surface 104 is the covered surface portion 120, while the first major surface 102 and the edges 106 of the glass-based substrate 100 are the exposed surface portion 130. The film 202 may be laminated onto the major surface 104 of the glass-based substrate 100. In such embodiments, the film 202 may be laminated to the entirety of the covered surface portion 120 (i.e., the major surface 104 in FIGS. 1A and 2A). As is depicted in FIGS. 1A and 1B, the film 202 may overlap the major surface 104, such that the surface area of the film 202 is greater than that of the major surface 104. However, in other embodiments, it is contemplated that the film 202 may be substantially the same size as the major surface 104, or may even be slightly smaller than the major surface 104. However, applying a film 202 that is larger than the major surface 104 may make removal of the film 202 from the major surface 104 easier when peeled.

Figure 2A:
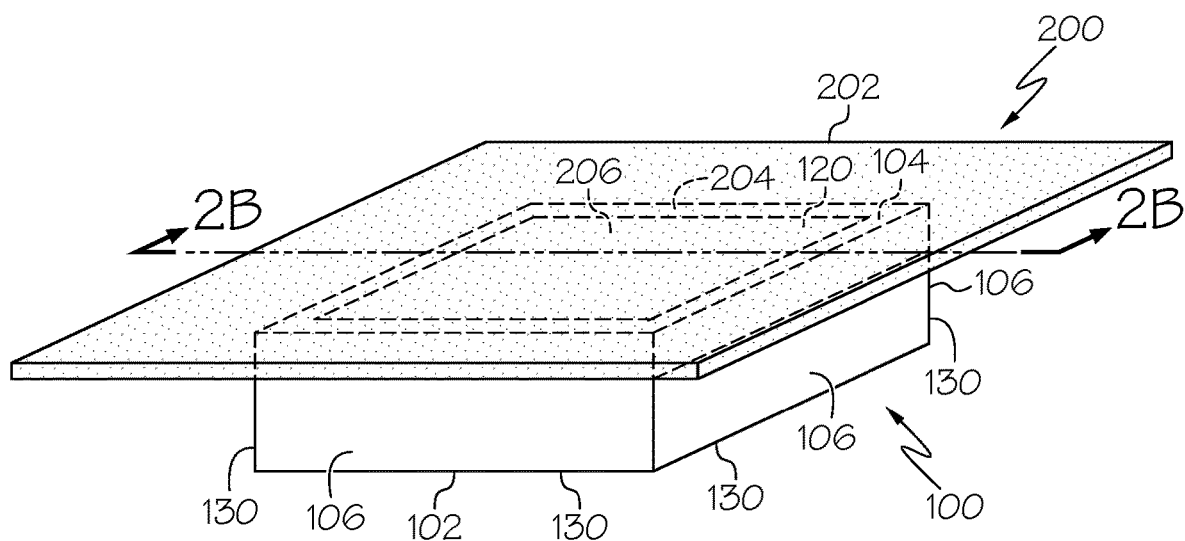
FIG. 2A schematically depicts a perspective view of another embodiment for etching only a portion of a glass-based substrate, according to one or more embodiments shown and described herein.
Figure 2B:
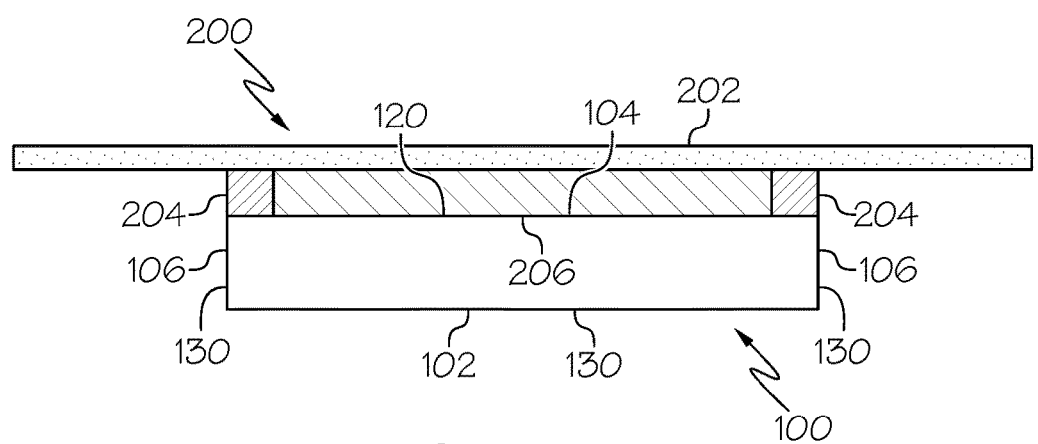
FIG. 2B schematically depicts a cross-sectional view of the embodiment of FIG. 2A, according to one or more embodiments shown and described herein.

Now referring to FIGS. 2A and 2B, a second embodiment of a cover article 200 comprising a film 202 and adhesive 204 on a glass-based substrate 100 is depicted. In such embodiments, the covered surface portion 120 is a portion of or an entirety of the major surface 104 of the glass-based substrate 100. The adhesive 204 may be in direct contact with a perimeter portion of the covered surface portion 120, and a film 202 may be in contact with the adhesive 204. As described throughout this disclosure, the perimeter portion need not be all the way to the edges 106 of the glass-based substrate 100 (as is schematically depicted). For example, the adhesive 204 may be near the edges 106, but leave some overhang of glass-based substrate 100. In such embodiments, the perimeter of the area covered by the adhesive 204 defines the covered surface portion 120. The cover article 200 may not be in direct contact with the entirety of the covered surface portion 120, but the film 202 and adhesive 204 form a protective barrier over the covered surface portion 120. As is depicted in the embodiments of FIGS. 2A and 2B, the adhesive 204 may be positioned around the perimeter of the major surface 104 (i.e., near or contracting the edge 106 of the glass-based substrate 100). The adhesive 204 may form a continuous ring that defines the boundaries of the covered surface portion 120, and may adhere the film 202 to the covered surface portion 120. In this embodiment, the exposed surface portion 130 is defined by the edges 106 and the major surface 102 of the glass-based substrate 100. The exposed surface portion 130 may also include any areas on the major surface 104 that are outside of the perimeter of the adhesive 204. The area outside of the ring of adhesive 204 is the exposed surface portion 130 in such embodiments (e.g., the edges 106 and the major surface 102 in FIGS. 2A and 2B).

Following contact with the etchant, the portions of the glass-based substrate 100 contacted by the adhesive 204 may be cut away from the interior portion of the glass-based substrate 100, leaving an glass-based substrate 100 with one side etched and the other side not etched and with no adhesive 204 or residue of adhesive 204. Optionally, a film 206 may be applied under the film 202. The film 206 may provide a protective layer on the major surface 104 upon removal of the adhesive 204 and film 202.

Figure 3A:
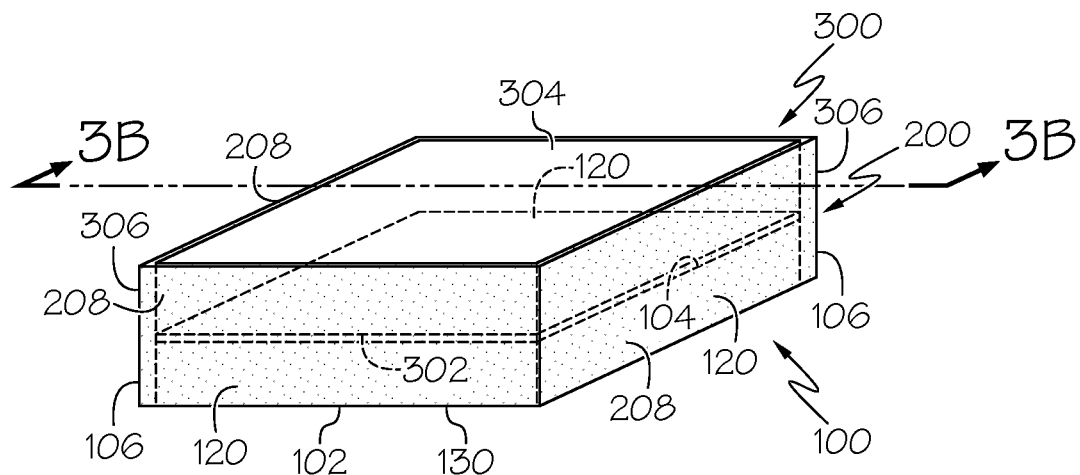
FIG. 3A schematically depicts a perspective view of yet another embodiment for etching only a portion of a glass-based substrate, according to one or more embodiments shown and described herein.
Figure 3B:
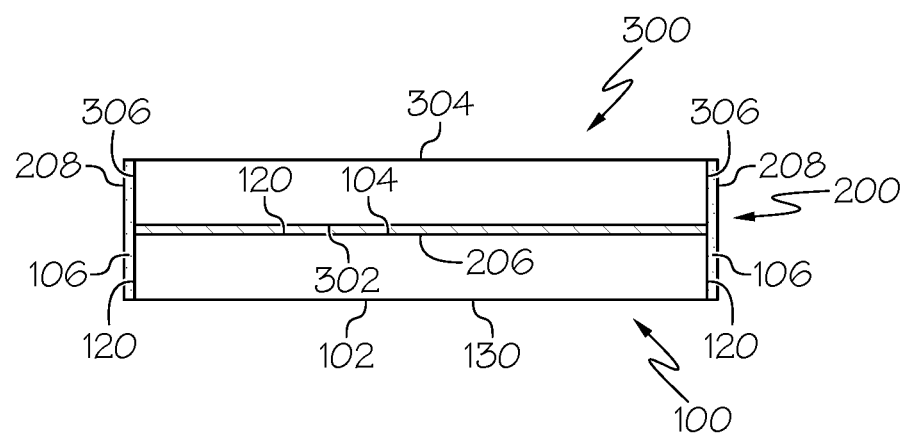
FIG. 3B schematically depicts a cross-sectional view of the embodiment of FIG. 3A, according to one or more embodiments shown and described herein.

Now referring to FIGS. 3A and 3B, a third embodiment of a cover article 200 on a glass-based substrate 100 is depicted. In the embodiments of FIGS. 3A and 3B, two glass sheets are etched at one time (glass-based substrate 100 and second glass-based substrate 300). The major surface 104 of the glass-based substrate 100 may be aligned and proximate the major surface 302 of the second glass-based substrate 300. As described throughout this disclosure, "proximate" means near or adjacent, such as separated only by a film or adhesive layer or such multilayer stack. The glass-based substrate 100 and the second glass-based substrate 300 may have a similar size to one another. As described herein, a similar size may refer to identical or slightly different sizes, such as dimensions within 5%, within 1%, or even within 0.1%. Optionally, a film 206 may be positioned between the glass-based substrate 100 and the second glass-based substrate 300, which may serve as protection during processing from the glass-based substrate 100 and second glass-based substrate 300 touching one another and potentially damaging one another. It should be understood that this film 206 is optional.

In the embodiment of FIGS. 3A and 3B, the cover article 200 comprises a coating 208 in contact with at least the edges 106 of the glass-based substrate 100 and the edges 306 of the second glass-based substrate 300. In such embodiments, the major surface 104 and major surface 302 are isolated from the etchant by the coating 208. The covered surface portion 120 comprises the major surface 104 of the glass-based substrate and all or a portion of the edges 106 of the glass-based substrate 100. While it is depicted that the entirety of the edges 106 and 306 are contacted by the coating 208, in some embodiments the coating 208 may only contact a portion of the edges 106, 306 of the glass-based substrate 100 and second glass-based substrate 300, respectively. The cover article 200, in such embodiments, may seal the space between the glass-based substrate 100 and second glass-based substrate 300.

Following contact with the etchant, the portions of the glass-based substrate 100 and second glass-based substrate 300 contacted by the coating 208 may be cut away from the interior portion of the glass-based substrate 100 and second glass-based substrate 300, leaving an glass-based substrate 100 with one side etched and the other side not etched and with no coating 208 or residue of coating 208.

Figure 4A:
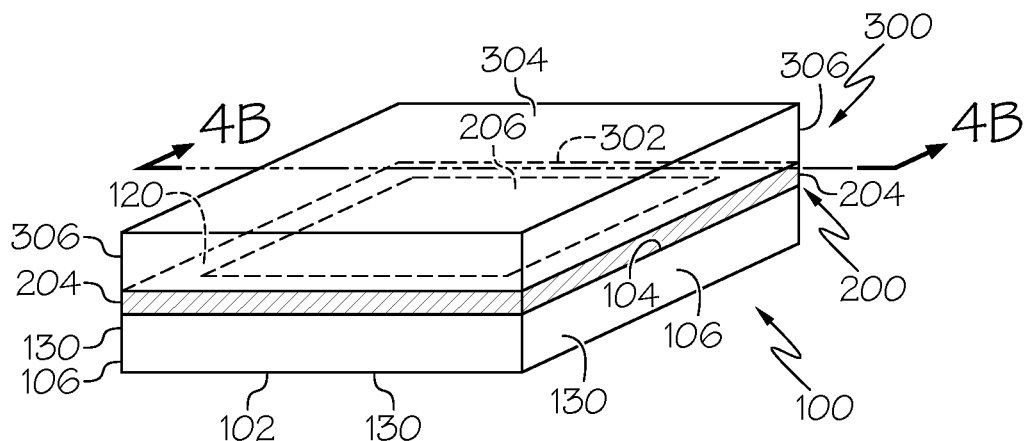
FIG. 4A schematically depicts a perspective view of yet another embodiment for etching only a portion of a glass-based substrate, according to one or more embodiments shown and described herein.
Figure 4B:
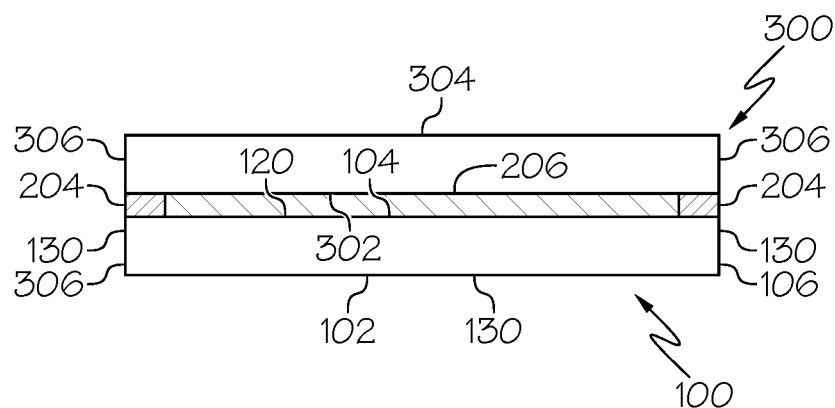
FIG. 4B schematically depicts a cross-sectional view of the embodiment of FIG. 4A, according to one or more embodiments shown and described herein.

Now referring to FIGS. 4A and 4B, a fourth embodiment of a cover article 200 on a glass-based substrate 100 is depicted. Similar in some aspects to the embodiment of FIGS. 3A and 3B, in this embodiment, two glass sheets are etched at one time (glass-based substrate 100 and second glass-based substrate 300). The major surface 104 of the glass-based substrate 100 may be aligned and proximate the major surface 302 of the second glass-based substrate 300. The glass-based substrate 100 and the major surface 302 may have a similar size to one another, or may have different sizes. A film 206 may be positioned between the glass-based substrate 100 and the second glass-based substrate 300, which may serve as protection during processing from the glass-based substrate 100 and second glass-based substrate 300 touching one another and potentially damaging one another. It should be understood that this film 206 is optional. The film 206 may be slightly smaller than the size of the glass-based substrate 100 and second glass-based substrate 300, allowing for a space to apply the adhesive 204, as described herein.

Still referring to FIGS. 4A and 4B, the cover article 200 may comprise an adhesive 204 in direct contact with a perimeter of the a major surface 104 of the glass-based substrate 100 120. The adhesive 204 may be in direct contact with the major surface 302 of the second glass-based substrate 300. The covered surface portion may be that within the perimeter of the adhesive 204 ring. In embodiments where the adhesive 204 is at or near the edges 106, the entire major surface 104 may be the covered surface portion 120. Following contact with the etchant, the portions of the glass-based substrate 100 and second glass-based substrate 300 contacted by the adhesive 204 may be cut away from the interior portion of the glass-based substrate 100 and second glass-based substrate 300, leaving a glass-based substrate 100 with one side etched and the other side not etched and with no adhesive 204 or residue of adhesive 204.

Figure 5A:
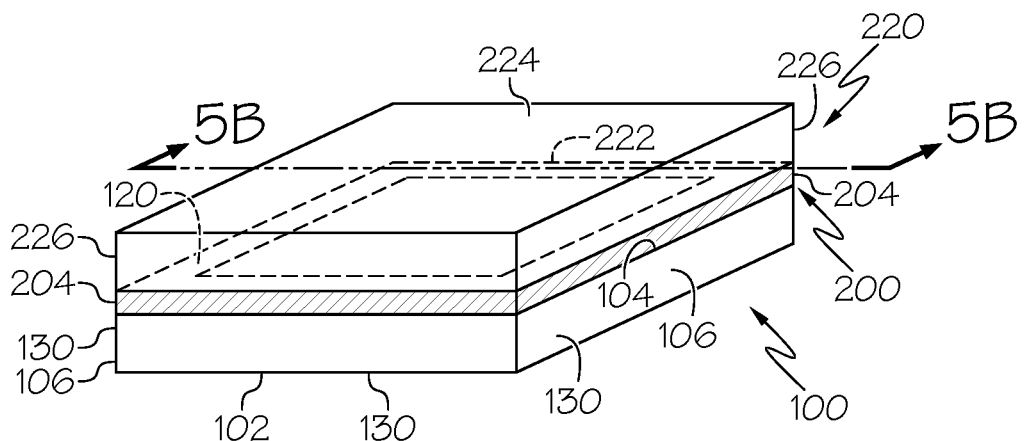
FIG. 5A schematically depicts a perspective view of yet another embodiment for etching only a portion of a glass-based substrate, according to one or more embodiments shown and described herein.
Figure 5B:
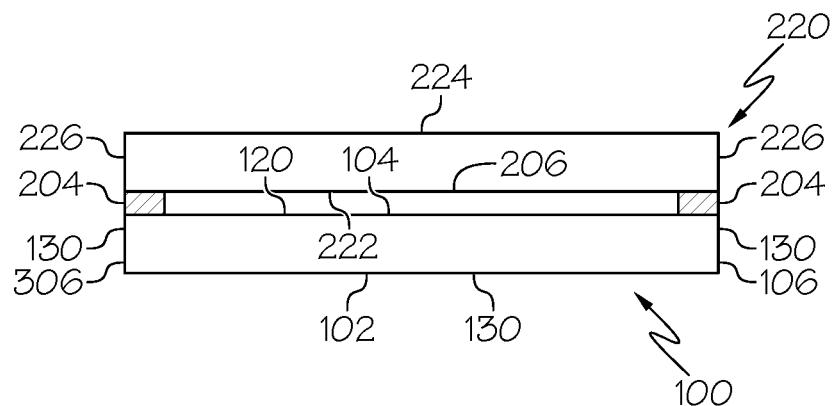
FIG. 5B schematically depicts a cross-sectional view of the embodiment of FIG. 5A, according to one or more embodiments shown and described herein.

Now referring to FIGS. 5A and 5B, a fifth embodiment of a cover article 200 on a glass-based substrate 100 is depicted. In such embodiments, the cover article 200 may comprise an adhesive 204 and a rigid article 220. This embodiment is similar in some aspects to the embodiment of FIGS. 3A and 3B, or FIGS. 4A and 4B, where two glass-based substrates 100, 300 are utilized. However, in the embodiment of FIGS. 5A and 5B, one glass-based substrate is replaced with a rigid sheet 220, such as a polymeric rigid sheet, that is a portion of the cover article 200. As such, in this embodiment, the major surface 104 of the glass-based substrate 100 may be aligned and proximate the major surface 222 of the major surface 222 of the rigid sheet 220. The rigid sheet 220 may further comprise a major surface 224 opposite the major surface 222, as well as edges 226. The glass-based substrate 100 and the major surface 222 may have a similar size to one another or may have different sizes. For example, the rigid sheet 220 may be larger than the glass-based substrate 100 in the length or width directions, or both.

Still referring to FIGS. 5A and 5B, the cover article 200 may comprise an adhesive 204 in direct contact with a perimeter of the a major surface 104 of the glass-based substrate 100 and in direct contact with the major surface 222 of the rigid sheet 220. The covered surface portion 120 may be that within the perimeter of the ring of adhesive 204. In embodiments where the adhesive 204 is at or near the edges 106, substantially the entire major surface 104 may be the covered surface portion 120, where the outer bounds of the adhesive 204 define the perimeter of the covered surface portion 120. Following contact with the etchant, the portions of the glass-based substrate 100 and rigid sheet 220 contacted by the adhesive 204 may be cut away from the interior portion of the glass-based substrate 100 and rigid sheet 220, leaving a glass-based substrate 100 with one side etched and the other side not etched and with no adhesive 204 or residue of adhesive 204. In additional embodiments, the adhesive 204 may be removed. The rigid sheet 220 may be discarded or reused following the etching process. As is depicted in FIG. 5B, an air gap may be present between the rigid sheet 220 and the glass-based substrate 100.

Figure 6A:
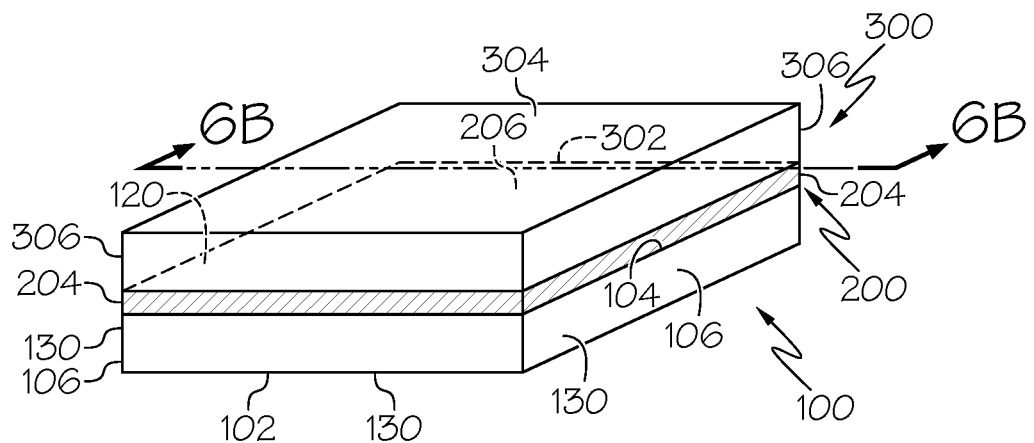
FIG. 6A schematically depicts a perspective view of yet another embodiment for etching only a portion of a glass-based substrate, according to one or more embodiments shown and described herein.
Figure 6B:
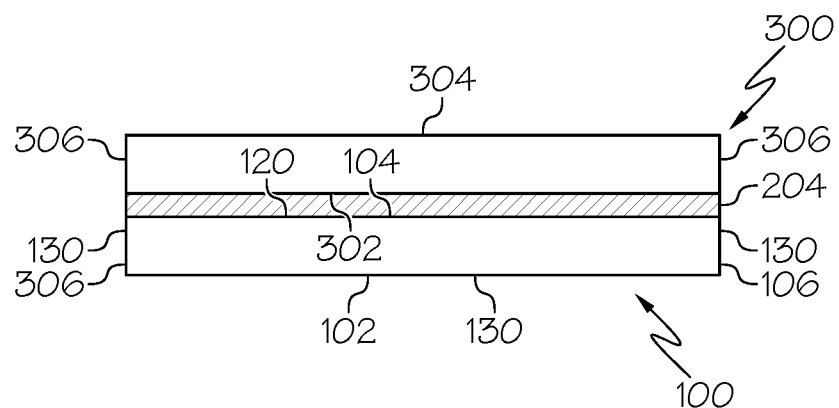
FIG. 6B schematically depicts a cross-sectional view of the embodiment of FIG. 6A, according to one or more embodiments shown and described herein.

Now referring to FIGS. 6A and 6B, a sixth embodiment of a cover article 200 on a glass-based substrate 100 is depicted. Similar in some aspects to the embodiment of FIGS. 4A and 4B, in this embodiment, two glass sheets are etched at one time (glass-based substrate 100 and second glass-based substrate 300). However, in this embodiment, substantially the entire covered surface portion 120 is contacted by adhesive 204. Rather than a "ring" of adhesive 204, the entirety of the covered surface portion 120 is contacted by a removable adhesive 204. As such, the adhesive 204 may be applied over a portion of or the entirety of the major surface 104 of the glass-based substrate 100. As is described, this adhesive 204, formed in a layer, may be removed following etching, according to one or more embodiments. In such embodiments, the major surface 104 of the glass-based substrate 100 may be aligned and proximate the major surface 302 of the second glass-based substrate 300. The glass-based substrate 100 and the major surface 302 may have a similar size to one another, or may have different sizes. The adhesive 204 may be positioned between the glass-based substrate 100 and the second glass-based substrate 300.

Still referring to FIGS. 6A and 6B, the cover article 200 may comprise the adhesive 204 in direct contact with substantially the entirety of, or the entirety of, the a major surface 104 of the glass-based substrate 100 and in direct contact with the major surface 302 of the second glass-based substrate 300. The covered surface portion may be that area defined by the outermost perimeter of the adhesive 204. In embodiments where the adhesive 204 is at or near the edges 106, the entire major surface 104 may be the covered surface portion 120. Following contact with the etchant, the adhesive 204 may be selectively removed, as is described herein, leaving a glass-based substrate 100 with one side etched and the other side not etched and with no adhesive 204 or residue of adhesive 204.

In some embodiments, the layer of adhesive 204 may not stretch all the way to the edges 106 of the glass-based substrate 100. For example, there may be a portion of the perimeter of the major surface 104 that does not contact adhesive 204. In such embodiments, such a perimeter section may be cut away following etching processing, since it may be exposed to etching.

Figure 7A:
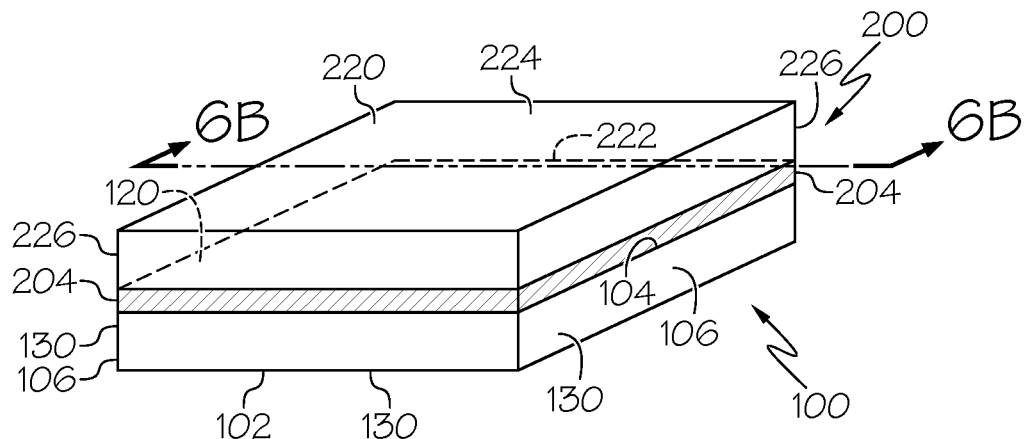
FIG. 7A schematically depicts a perspective view of yet another embodiment for etching only a portion of a glass-based substrate, according to one or more embodiments shown and described herein.
Figure 7B:
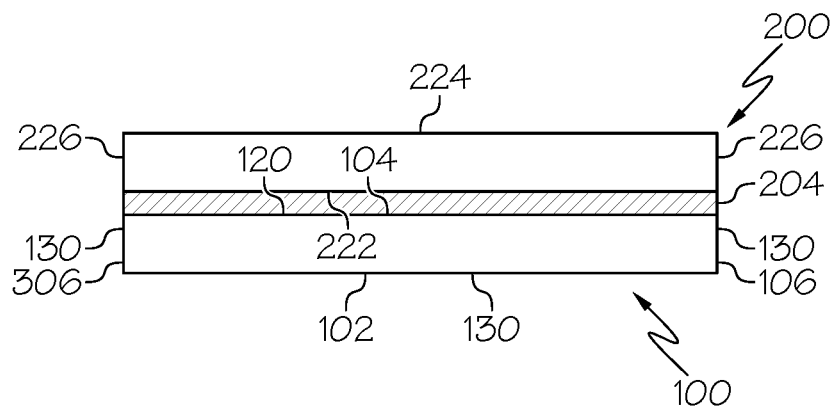
FIG. 7B schematically depicts a cross-sectional view of the embodiment of FIG. 7A, according to one or more embodiments shown and described herein.

Now referring to FIGS. 7A and 7B, the embodiment of FIGS. 6A and 6B may be modified such that a rigid sheet 220 is utilized in place of a second glass-based substrate. It should be understood that, while not depicted in a figure, a continuous layer of adhesive 204 as depicted in FIGS. 6A and 6B may be positioned between the glass-based substrate 100 and a rigid sheet 220 as described with respect to FIGS. 5A and 5B. In such embodiments, a rigid sheet 220 is substituted for the second glass-based substrate 300 of FIGS. 6A and 6B. Moreover, any embodiment described herein utilizing a second glass-based substrate may utilize a rigid sheet in its replacement, which is later discarded or reused.

As depicted in FIGS. 7A and 7B, the cover article 200 may comprise an adhesive 204 and a rigid sheet 220, wherein the cover article 200 is applied onto the glass-based substrate 100 such that a first major surface 104 of the glass-based substrate 100 is aligned and proximate to a first major surface 222 of the rigid sheet 220, and wherein the adhesive 204 is in direct contact with the entirety of the covered surface portion 120 and is in direct contact with at least a portion of the first major surface 222 of the rigid sheet 220. In some embodiments, the adhesive contacts the entirety of the first major surface 104 of the glass-based substrate 100.

In all embodiments that include an adhesive 204, the adhesive 204 may be substituted for a dry film, which may be laminated. Generally, adhesives may be flowable as applied, while films are generally dry and/or preformed articles of given thickness. In one or more embodiments, such as, without limitation, those of FIGS. 4A, 5A, 6A, and 7A, a film or adhesive may be utilized where adhesive 204 is depicted. In the embodiments, of FIGS. 4A and 5A, a "window" shaped film may be applied at least at or near the edges 106 of the glass-based substrate 100. In the embodiments of FIGS. 6A and 7A, a film may be applied onto the entire major surface 104 of the glass-based substrate 100. In all of, for example, the embodiments of FIGS. 4A, 5A, 6A, and 7A, there may be an overhang of film. That is, the film may have a greater length or width, or both, than the glass-based substrate 100.

It should be understood that where etching is performed on two glass-based substrates 100, 300 (e.g., the embodiments of FIGS. 3A, 4A, and 6A), two glass-based substrates 100, 300 may be simultaneously processed, which may increase yield. However, embodiments where a rigid sheet 220 is utilized may be desirable in some circumstances for ease of removal of the rigid sheet 220 from the glass-based substrate or transport of the glass-based substrate 100 while attached to the rigid sheet 220.

In some embodiments, the second glass-based substrate 300 may be "sacrificial," and may not be an end product substantially identical to the glass-based substrate 100. In some embodiments, such sacrificial second glass-based substrates 300 may be re-usable. In some embodiments, the second glass-based substrate 300 or rigid sheet 220 may provide a rigid support for an ultra-thin glass based substrate 100 which, alone, may not have sufficient strength to remain flat during processing.

According to various embodiments, the etchant may have a pH of at least 10 and a temperature of at least 90° C. during at least a portion of the contacting of the etchant with the exposed surface portion and the cover article. The etchant may be at an elevated temperature during the etching process, which may increase the etching rate compared to lesser temperatures. In one or more embodiments, the etchant is at a temperature of greater than or equal to 90° C. to less than or equal to 140° C., such as greater than or equal to 90° C. to less than or equal to 132° C., greater than or equal to 95° C. to less than or equal to 135° C., greater than or equal to 100° C. to less than or equal to 130° C., greater than or equal to 105° C. to less than or equal to 125° C., greater than or equal to 110° C. to less than or equal to 120° C., greater than or equal to 90° C. to less than or equal to 115° C., and any and all sub-ranges formed from the foregoing endpoints. The pH of the etchant may be at least 10, at least 10.5, at least 11, at least 11.5, at least 12, at least 12.5, at least 13, at least 13.5, or even at least 14.

In embodiments, the etchant may be an aqueous hydroxide solution with a hydroxide concentration of greater than or equal to 5 wt % to less than or equal to 60 wt %, such as greater than or equal to 10 wt % to less than or equal to 45 wt %, greater than or equal to 15 wt % to less than or equal to 40 wt %, greater than or equal to 20 wt % to less than or equal to 35 wt %, greater than or equal to 25 wt % to less than or equal to 30 wt %, and any and all sub-ranges formed from any of the foregoing endpoints. In additional embodiments, the etchant may include NaOH, KOH, or combinations thereof. The etchant may be substantially free or free of hydrofluoric acid. In embodiments, the glass-based articles described herein are produced without employing hydrofluoric acid.

In one or more embodiments, the time sufficient to etch the exposed surface portion may be greater than or equal to 15 minutes to less than or equal to 400 minutes. The etching process may be conducted for a time period sufficient to produce the desired surface properties, such as haze. In embodiments, the glass-based substrate is contacted with the etchant for a time period of greater than or equal to 15 minutes to less than or equal to 400 minutes, such as greater than or equal to 30 minutes to less than or equal to 300 minutes, greater than or equal to 40 minutes to less than or equal to 390 minutes, greater than or equal to 50 minutes to less than or equal to 380 minutes, greater than or equal to 60 minutes to less than or equal to 370 minutes, greater than or equal to 70 minutes to less than or equal to 360 minutes, greater than or equal to 80 minutes to less than or equal to 350 minutes, greater than or equal to 90 minutes to less than or equal to 340 minutes, greater than or equal to 100 minutes to less than or equal to 330 minutes, greater than or equal to 110 minutes to less than or equal to 320 minutes, greater than or equal to 120 minutes to less than or equal to 310 minutes, greater than or equal to 130 minutes to less than or equal to 300 minutes, greater than or equal to 140 minutes to less than or equal to 290 minutes, greater than or equal to 150 minutes to less than or equal to 280 minutes, greater than or equal to 160 minutes to less than or equal to 270 minutes, greater than or equal to 170 minutes to less than or equal to 260 minutes, greater than or equal to 180 minutes to less than or equal to 250 minutes, greater than or equal to 190 minutes to less than or equal to 240 minutes, greater than or equal to 200 minutes to less than or equal to 230 minutes, greater than or equal to 210 minutes to less than or equal to 220 minutes, and any and all sub-ranges formed from any of the foregoing endpoints.

The etching process may be selected to achieve a surface removal rate that provides the desired etching speed. In general, faster etching rates are desired, as fast etching rates increase manufacturing throughput. However, when an etching rate is too high surface uniformity may be reduced and cosmetic defects may develop. The etching rate is a function of the etchant and the composition of the glass-based substrate. In embodiments, the etching occurs at a surface removal rate of less than or equal to 10 μm/hour, such as less than or equal to 9.5 μm/hour, less than or equal to 9 μm/hour, less than or equal to 8.5 μm/hour, less than or equal to 8 μm/hour, less than or equal to 7.5 μm/hour, less than or equal to 7 μm/hour, less than or equal to 6.5 μm/hour, less than or equal to 6 μm/hour, less than or equal to 5.5 μm/hour, less than or equal to 10 μm/hour, or less.

The etching rate and etching time may be selected to remove a desired amount of material from the surface of the glass-based substrate. If the amount of material removed in the etching step is too low the desired surface properties, such as haze, may not be achieved. Removing too much material from the abraded surface may increase cost and reduce manufacturing throughput. In embodiments, the etching process removes greater than or equal to 5 μm to less than or equal to 50 μm from the abraded surface, such as greater than or equal to 10 μm to less than or equal to 45 μm, greater than or equal to 15 μm to less than or equal to 40 μm, greater than or equal to 20 μm to less than or equal to 35 μm, greater than or equal to 25 μm to less than or equal to 30 μm, and any and all ranges formed from the foregoing endpoints. The amount of material removed from the abraded surface is measured in the thickness direction of the glass-based article by micrometer unless otherwise indicated.

Given the relative extreme pH and temperature conditions of the etching process, the materials of the cover article are resistant to major degradation in such conditions. Suitable materials of the cover articles include any that remain impervious to the etchant throughout the desired etching time and conditions.

In one or more embodiments, the cover article 200 may comprise a wide variety of materials and types. The materials utilized for cover articles 200 in the methods described herein do not substantially degrade when contacted by basic etchants. That is, the materials of the cover article generally are not destroyed or substantially damaged by the basic etchant, even when exposed for relatively long periods of time. For example, the embodiments of FIGS. 1A-7B utilize films and/or adhesives. However, other suitable cover articles may be incorporated in any combination, such as sheets, coatings, paints, or tapes, in any combination. The cover article 200 may comprise materials such as polymers, metals, ceramics, etc. Polymers contemplated include, without limitation, silicone, siloxane, polyimide, polyvinyl chloride, polypropylene, cyclic olefin copolymer, cyclic olefin polymer, vinyl, and polyethylene. The materials may include foaming agents, adhesion promoters, catalysts, cross-linking agents, or other additives. It is contemplated that polymeric materials may be applied and then cured with, e.g., light or heat. In additional embodiments, the adhesive, film layers, or both, may comprise one or more of thermosetting resins, thermal foaming agents containing amine carbonate salts, epoxy/esters, silicones and or acrylic components. The adhesive layers may also encompass thermoplastic resins with engineered glass transition temperature in combination with softening temperature for additives.

In one or more embodiments, the film, adhesive, or both, utilized as the cover article may have a peel strength of at least 0.2N/25 mm. For example, the film, adhesive, or both, utilized as the cover article may have a peel strength of at least 0.5 N/25 mm, at least 1 N/25 mm, at least 2 N/25 mm, at least 3 N/25 mm, at least 4 N/25 mm, at least 5 N/25 mm, at least 6 N/25 mm, or even at least 7 N/25 mm. Unless otherwise described, peel strength is measured by ASTM D3330 standard. In additional embodiments, the films and/or adhesives have a peel strength of those values as measured under JIS Z1528 standard.

As described herein, films or adhesives utilized herein may, according to some embodiments, be de-boned from the glass-based substrates by removal processes such as heating cooling, UV light exposure, mechanical means, or laser exposure. These processes may be included in step 550 of the process of FIG. 9, where the cover article is removed from the glass-based substrate.

In one or more embodiments, the film or adhesive is selectively de-bondable from the glass-based substrate by cooling. For example, in some embodiments, the film, adhesive, or both, may be selectively de-bondable from the glass-based substrate by exposure to temperatures of less than or equal to 10° C., such as less than or equal to 0° C., less than or equal to −10° C., or even less than or equal to −20° C.

In one or more embodiments, the film or adhesive is selectively de-bondable from the glass-based substrate by heating. For example, in some embodiments, the film, adhesive, or both, may be selectively de-bondable from the glass-based substrate by exposure to temperatures of greater than or equal to 150° C., such as greater than or equal to 175° C., greater than or equal to 200° C., or even greater than or equal to 225° C. In additional embodiments, the film or adhesive is selectively de-bondable from the glass-based substrate by heating to a temperature greater than the temperature of the etchant by at least 5° C., at least 10° C., or even at least 25° C.

In one or more embodiments, the film or adhesive is selectively de-bondable from the glass-based substrate by exposure to UV light. In embodiments, the adhesive layers may be debondable by irradiation with ultraviolet (UV) light, such as irradiation with light at a wavelength from greater than or equal to 10 nm to less than or equal to 400 nm. In embodiments, the adhesive layers may be debondable by irradiation at a given intensity.

In one or more embodiments, the film or adhesive is selectively de-bondable from the glass-based substrate by mechanical or laser means. Such mechanical means may include scribing and/or cutting.

Without wishing to be bound by any particular theory, in some embodiments the adhesive and/or films may expand when de-bonded (after etching operation) such that adhesion between the adhesive layer and the adjacent glass-based (and/or polymer based and/or metal based layer(s) of a rigid sheet) is reduced or eliminated, allowing the removal of the adhesive/adhesive coated film layer. De-bonding may be effected by heat, cold, mechanical means, and/or irradiation. These processes/environments may decouple the adhesive or film from the glass-based article by thermal expansion or removal when very little bond is present following etching processing.

In one or more embodiments, the film or adhesive may comprise foaming agents. In such embodiments where the film or adhesive comprises foaming agents, the foaming agent may promote expansion when heated. Such expansion may cause separation of the adhesive or coating from the glass-based substrate.

Without limitation, commercially available films that may be suitable for selective de-bonding include PS-213VTE #50, PS-2115TE, PS-2021TE, PS-213VTE #100, and PS-2011IE produced by SOMAR Corporation; Intelimer CS5525NW2; 6914T14 and 6914T13 produced by NITTA Corporation; 1030W, 1030WN, 1030WD, 1030WX, 2230GX and 1020TN produced by Okamoto; HS 32, various heat resistant adhesive films like PF6390-20 by SELFA and Maxell Corporation; Revalpha produced by Nitta Denko; NE-GE60UV120, NE-GE80UV120, MHM-GA25, MHM-GA50 produced by Nichie Kakoh; and Valtron Epoxy AD4010-A and AD4015-B produced by Valtech. Examples of films which may de-bond under heat include, without limitation, those produced by Somar and NITTA. Examples of films which may de-bond under cold conditions include, without limitation, Intelimer CS5525NW2. Examples of films which may de-bond under UV light include, without limitation, some produced by Maxell and SELFA.

It should be understood that the methods described herein may include the removal of the entirety of the adhesive and/or film by the processes described (e.g., heating, cooling, UV light exposure, mechanical means).

Figure 10:
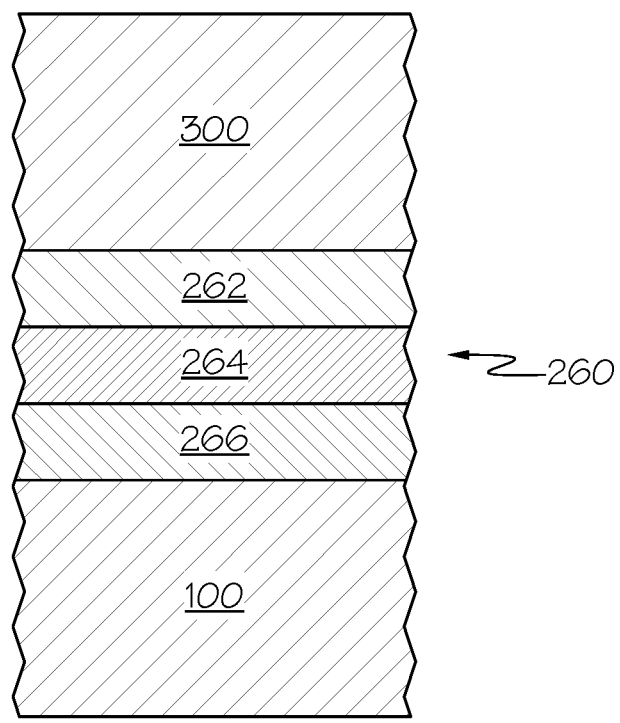
FIG. 10 schematically depicts a multi-layer film on a glass-based substrate, according to one or more embodiments shown and described herein.

Now referring to FIG. 10, according to one or more embodiments, the films described herein may comprise a multilayer structure 260 positioned between, for example, the glass-based substrate 100 and second glass-based substrate 300. Such multilayer structures 260 may include tri-layer embodiments that include a core layer 264 and two outer adhesion layers 262, 266. The core layer 264 may be, for example, polyimide, and the outer adhesion layers 262, 266 may comprise silicone with or without a foaming agent. Other materials of the core layer 264 may include ethylene propylene diene polymers, polypropylene, and Ni and/or fluorocarbon infused structural materials. It should be understood that such multilayer structures 260 may be utilized in any embodiment described herein where a film or adhesive is used and, particularly, where a film or adhesive forms a bond between two substrates (e.g., two glass-based substrates or a glass-based substrate and a rigid sheet).

According to additional embodiments, a material of the film or adhesive may chemically react with the etchant to form a product material. This product material may form a barrier which provides further protection from permeability of the etchant. In one embodiment, a silicone-based film or adhesive may react with NaOH to form sodium silicate (sometimes known as liquid glass). The liquid glass may be washed away following etching.

According to one or more embodiments, where a rigid sheet 220 is utilized in the cover article, the rigid sheet 220 may be comprised of a polymeric material. The polymeric material may be polypropylene. In other embodiments the polymeric material may be other materials. In some embodiments, polypropylene may be desirable for use as a rigid sheet 220 due to it being non-reactive to the etchant, stable, and relatively high in modulus and strength such that it does not slump or fall off of the glass-based substrate 100 during etching, prior to etching, or following etching. Other materials may be suitable that exhibit similar properties. However, in other embodiments, the rigid sheet may be made of non-polymeric materials, such as inorganics, metals, etc.

The materials of the cover article in the present disclosure may differ from those utilized in conventional etching processes, such as HF acid etching. For example, typical materials utilized for HF acid etching include polyacrylic acids. However, polyacrylic acid is generally not suitable for basic etching as described herein since it will decompose to a degree where it cannot provide a barrier for the duration of etching. However, it is contemplated that these materials would not be suitable for the present embodiments utilizing basic etching at high temperatures.

Following etching, the cover article may be removed from the glass-based substrate. Such removal may be achieved by physical or chemical means. For example, some cover articles, such as polymer sheets, may be delaminated by peeling. In additional embodiments, a chemical treatment my decompose the cover article or sufficiently decompose the cover article such that it may be mechanically removed.

The methods described herein may include steps in addition to etching by exposure to a basic etchant at elevated temperatures. For example, in some embodiments, the cover article may be applied to the glass-based substrate, then the glass-based substrate with applied cover article may be abraded, and then the glass-based article may be etched, and then the glass-based article may be ion-exchanged. The cover article may be removed from the glass-based article prior to ion-exchange processing. These steps may be performed in various orders. Such steps, according to some embodiments, are depicted in FIG. 9.

According to some embodiments, at least a portion of the exposed surface portion of the glass-based substrate may be abraded. Abrasion may comprise propelling abrasive particles against the exposed surface portion prior to etching. In embodiments, the abrasion process may be a particulate blasting process, commonly referred to as media blasting or sand blasting, in which abrasive particles are propelled against the surface of the glass-based substrate by a pressurized fluid medium. The abrasion process may include one or more treatments of the surface. In embodiments, the abrasion process may be repeated one or more times to achieve the desired effect.

The abrasion process may employ any appropriate abrasive particles. In embodiments, the abrasive particles may include sand, $Al_2O_3$, SiC, $SiO_2$, and combinations thereof. The abrasive particles may have a particle size selected to produce the desired abrading effect. In embodiments, the abrasive particles may have a particle size greater than or equal to 1500 grit to less than or equal to 200 grit, such as greater than or equal to 1400 grit to less than or equal to 300 grit, greater than or equal to 1300 grit to less than or equal to 400 grit, greater than or equal to 1200 grit to less than or equal to 500 grit, greater than or equal to 1100 grit to less than or equal to 600 grit, greater than or equal to 1000 grit to less than or equal to 700 grit, greater than or equal to 900 grit to less than or equal to 800 grit, greater than or equal to 1200 grit to less than or equal to 200 grit, and any and all sub-ranges formed from any of the foregoing endpoints.

The abrasion process may employ any appropriate pressure and arrangement. In embodiments, the abrasive particles may be propelled by a fluid medium at a pressure greater than or equal to 5 psi to less than or equal to 50 psi, such as greater than or equal to 6 psi to less than or equal to 29 psi, greater than or equal to 7 psi to less than or equal to 28 psi, greater than or equal to 8 psi to less than or equal to 27 psi, greater than or equal to 9 psi to less than or equal to 26 psi, greater than or equal to 10 psi to less than or equal to 25 psi, greater than or equal to 11 psi to less than or equal to 24 psi, greater than or equal to 12 psi to less than or equal to 23 psi, greater than or equal to 13 psi to less than or equal to 22 psi, greater than or equal to 14 psi to less than or equal to 21 psi, greater than or equal to 15 psi to less than or equal to 20 psi, greater than or equal to 16 psi to less than or equal to 19 psi, greater than or equal to 17 psi to less than or equal to 18 psi, and any and all sub-ranges formed from any of the foregoing endpoints. In embodiments, the fluid medium propelling the abrasive particles is air. In embodiments, the abrasive particles are propelled from a nozzle at a distance from the surface of greater than or equal to 5 cm to less than or equal to 20 cm, such as greater than or equal to 6 cm to less than or equal to 19 cm, greater than or equal to 7 cm to less than or equal to 18 cm, greater than or equal to 8 cm to less than or equal to 17 cm, greater than or equal to 9 cm to less than or equal to 16 cm, greater than or equal to 10 cm to less than or equal to 15 cm, greater than or equal to 11 cm to less than or equal to 14 cm, greater than or equal to 12 cm to less than or equal to 13 cm, and any and all sub-ranges formed from any of the foregoing endpoints. The nozzle may be positioned such that the abrasive particles are propelled against the surface of the glass-based substrate at any angle from orthogonal to the surface, wherein an angle of 0° indicates that the abrasive particles are propelled along a path orthogonal to the surface. In embodiments, the abrasive particles are propelled against the surface of the glass-based substrate at any angle from orthogonal to the surface of greater than or equal to 0° to less than or equal to 60°, such as greater than or equal to 5° to less than or equal to 55°, greater than or equal to 10° to less than or equal to 50°, greater than or equal to 15° to less than or equal to 45°, greater than or equal to 20° to less than or equal to 40°, greater than or equal to 25° to less than or equal to 35°, greater than or equal to 0° to less than or equal to 30°, and any and all sub-ranges formed from any of the foregoing endpoints.

In one or more embodiments, following etching, the glass-based substrate may be chemically strengthened, such as by ion-exchange. Such chemically strengthened glass-based articles exhibit improved damage resistant for applications such as, but not limited to, display covers. The chemical strengthening of the glass-based articles increases the strength of the glass-based articles.

In the ion-exchange treatment, the etched glass-based substrate is contacted with a molten salt bath to produce the ion-exchanged glass-based article. In embodiments, the etched glass-based substrate may be submerged in the molten salt bath. In embodiments, the molten salt bath includes a molten nitrate salt. The molten nitrate salt may include $KNO_3$, $NaNO_3$, or combinations thereof. In embodiments, the molten salt bath comprises $NaNO_3$ and $KNO_3$. The molten salt bath may additionally include silicic acid.

The etched glass-based substrate may be exposed to the molten salt bath by dipping the etched glass-based substrate into the molten salt bath. Upon exposure to the etched glass-based substrate, the molten salt bath may, according to embodiments, may be at a temperature of greater than or equal to 350° C. to less than or equal to 500° C., such as greater than or equal to 360° C. to less than or equal to 490° C., greater than or equal to 370° C. to less than or equal to 480° C., greater than or equal to 390° C. to less than or equal to 470° C., greater than or equal to 400° C. to less than or equal to 460° C., greater than or equal to 410° C. to less than or equal to 450° C., greater than or equal to 420° C. to less than or equal to 440° C., greater than or equal to 350° C. to less than or equal to 430° C., and any and all sub-ranges formed from any of the foregoing endpoints.

The ion-exchange treatment may continue for any time period sufficient to produce the desired stress characteristics in the glass-based article. In embodiments, the etched glass-based substrate may be exposed to the molten salt bath for a time period greater than or equal to 10 minutes to less than or equal to 500 minutes, such as greater than or equal to 10 minutes to less than or equal to 300 minutes, greater than or equal to 20 minutes to less than or equal to 490 minutes, greater than or equal to 30 minutes to less than or equal to 480 minutes, greater than or equal to 40 minutes to less than or equal to 470 minutes, greater than or equal to 50 minutes to less than or equal to 460 minutes, greater than or equal to 60 minutes to less than or equal to 450 minutes, greater than or equal to 70 minutes to less than or equal to 440 minutes, greater than or equal to 80 minutes to less than or equal to 430 minutes, greater than or equal to 90 minutes to less than or equal to 420 minutes, greater than or equal to 100 minutes to less than or equal to 410 minutes, greater than or equal to 110 minutes to less than or equal to 400 minutes, greater than or equal to 120 minutes to less than or equal to 390 minutes, greater than or equal to 130 minutes to less than or equal to 380 minutes, greater than or equal to 140 minutes to less than or equal to 370 minutes, greater than or equal to 150 minutes to less than or equal to 360 minutes, greater than or equal to 160 minutes to less than or equal to 350 minutes, greater than or equal to 170 minutes to less than or equal to 340 minutes, greater than or equal to 180 minutes to less than or equal to 330 minutes, greater than or equal to 190 minutes to less than or equal to 320 minutes, greater than or equal to 200 minutes to less than or equal to 310 minutes, greater than or equal to 210 minutes to less than or equal to 300 minutes, greater than or equal to 220 minutes to less than or equal to 290 minutes, greater than or equal to 230 minutes to less than or equal to 280 minutes, greater than or equal to 240 minutes to less than or equal to 270 minutes, greater than or equal to 250 minutes to less than or equal to 260 minutes, and any and all sub-ranges formed from any of the foregoing endpoints.

Figure 8A:
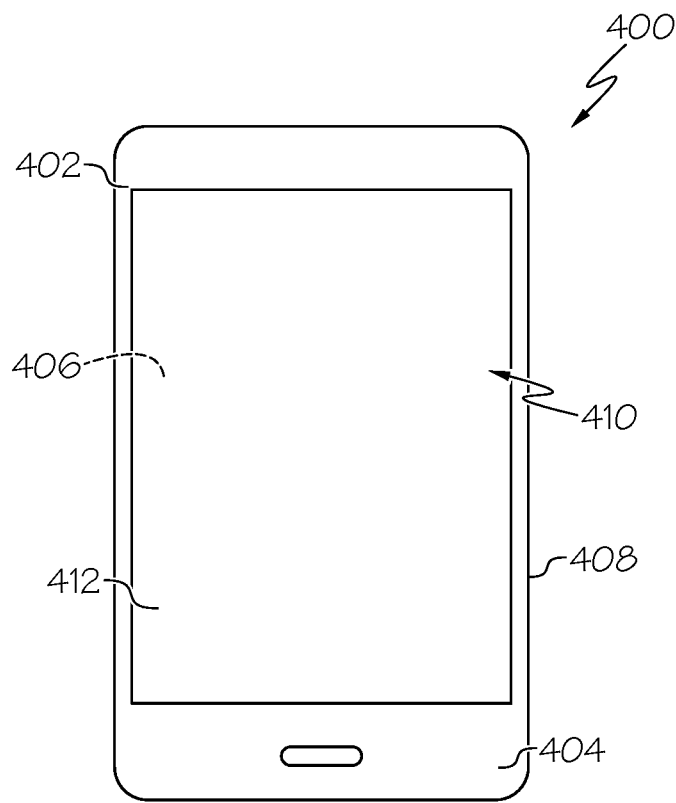
FIG. 8A is a plan view of an exemplary electronic device incorporating any of the glass-based substrates disclosed herein.
Figure 8B:
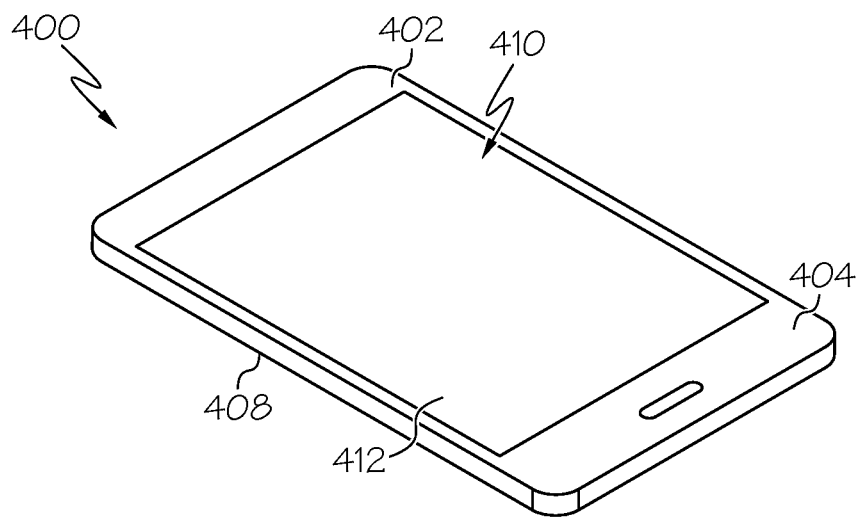
FIG. 8B is a perspective view of the exemplary electronic device of FIG. 8A.

As described herein, the etching, along with other optional processing steps, may form textured glass-based articles. Textured glass-based articles disclosed herein, in as-formed or ion-exchanged form, may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 8A and 8B. Specifically, FIGS. 8A and 8B show a consumer electronic device 400 including a housing 402 having front 404, back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In embodiments, at least a portion of at least one of the cover substrate 412 and/or the housing 402 may include any of the glass-based articles disclosed herein.

As described above, the textured glass-based articles described herein can be used as a front or back cover for mobile electronic devices. The glass-based articles not only serve as protective covers but also serve to enable various functionalities of the mobile electronic devices. For example, the textured glass-based articles may possess desirable antiglare properties which improve display readability in the presence of strong ambient light conditions, may improve the touch feel, and may also provide a desirable aesthetic appearance.

The properties of the glass-based articles will now be described in detail. The glass-based articles are characterized by a haze level, and may also be characterized by a surface roughness, distinctness of image, pixel power deviation, and gloss 60° value. These values are dependent upon the processing procedures, and disclosed values for these parameters are not necessarily present in all embodiments.

The haze of the glass-based article may be relatively low and may provide desirable optical properties and a pleasing aesthetic appearance. For example, the haze of the glass-based article provides an antiglare capability that improves performance in high ambient light conditions, such as bright sunlight. In embodiments, the haze may be less than or equal to 40%, such as less than or equal to 35%, less than or equal to 30%, less than or equal to 25%, less than or equal to 20%, less than or equal to 15%, less than or equal to 10%, less than or equal to 5%, or less. In embodiments, the haze may be greater than or equal to 3% to less than or equal to 40%, such as greater than or equal to 5% to less than or equal to 35%, greater than or equal to 10% to less than or equal to 30%, greater than or equal to 15% to less than or equal to 25%, greater than or equal to 20% to less than or equal to 40%, and any and all sub-ranges formed between any of the foregoing endpoints. As used herein, haze refers to "transmittance haze," and is measured using a Haze-gird Transparency Transmission Haze Meter, according to ASTM D1003 "Standard Test Method for Haze and Luminous Transmittance of Transparent Plastics" using Illuminant C.

The glass-based articles may have any surface roughness on etched regions sufficient to produce the desired haze level. The surface roughness also provides the glass-based articles with a pleasing touch feel. In embodiments, the glass-based articles may have a surface roughness greater than or equal to 100 nm to less than or equal to 400 nm, such as greater than or equal to 110 nm to less than or equal to 390 nm, greater than or equal to 120 nm to less than or equal to 380 nm, greater than or equal to 130 nm to less than or equal to 370 nm, greater than or equal to 140 nm to less than or equal to 360 nm, greater than or equal to 150 nm to less than or equal to 350 nm, greater than or equal to 160 nm to less than or equal to 340 nm, greater than or equal to 170 nm to less than or equal to 330 nm, greater than or equal to 180 nm to less than or equal to 320 nm, greater than or equal to 190 nm to less than or equal to 310 nm, greater than or equal to 200 nm to less than or equal to 300 nm, greater than or equal to 210 nm to less than or equal to 290 nm, greater than or equal to 220 nm to less than or equal to 280 nm, greater than or equal to 230 nm to less than or equal to 270 nm, greater than or equal to 240 nm to less than or equal to 260 nm, greater than or equal to 250 nm to less than or equal to 400 nm, and any and all sub-ranges formed from any of the foregoing endpoints. As used herein, unless otherwise specified, "surface roughness" refers to Ra, the arithmetical mean deviation of a measured profile. Unless otherwise specified, Ra is measured on a Zygo 7000 with the following settings: Scan size was 180 microns by 220 microns; Objective: 20× Mirau; Image Zoom 2×; Camera resolution 0.2777 microns; Filter: low Pass; Filter Type: Average; Filter Low Wavelength 0; Filter High Wavelength: 0.83169 microns.

The glass-based articles may be characterized by a gloss value, such as a gloss 60° value. In embodiments, the glass-based articles may have a gloss 60° value of less than or equal to 40%, such as less than or equal to 35%, less than or equal to 30%, less than or equal to 25%, less than or equal to 20%, less than or equal to 15%, or less. In embodiments, the glass-based articles may have a gloss 60° value of greater than or equal to 10% to less than or equal to 40%, such as greater than or equal to 15% to less than or equal to 35%, greater than or equal to 20% to less than or equal to 30%, greater than or equal to 25% to less than or equal to 40%, greater than or equal to 15% to less than or equal to 40%, and any and all sub-ranges formed from any of the foregoing endpoints. Gloss 60° or gloss 60 refers to a measurement taken at 60° from vertical using a Rhopoint Gloss Meter.

The glass-based articles may be characterized by a distinctness of image (DOI) value. In embodiments, the glass-based articles may have a DOI of less than or equal to 92%, such as less than or equal to 91%, less than or equal to 90%, less than or equal to 89%, less than or equal to 90%, less than or equal to 89%, less than or equal to 88%, less than or equal to 87%, less than or equal to 86%, less than or equal to 85%, less than or equal to 84%, less than or equal to 83%, less than or equal to 82%, less than or equal to 81%, less than or equal to 80%, less than or equal to 79%, or less. In embodiments, the glass-based articles have a DOI of greater than or equal to 75% to less than or equal to 92%, such as greater than or equal to 76% to less than or equal to 91%, greater than or equal to 77% to less than or equal to 90%, greater than or equal to 78% to less than or equal to 89%, greater than or equal to 79% to less than or equal to 88%, greater than or equal to 80% to less than or equal to 87%, greater than or equal to 81% to less than or equal to 86%, greater than or equal to 82% to less than or equal to 85%, greater than or equal to 83% to less than or equal to 84%, and any and all subranges formed from any of the foregoing endpoints. Unless otherwise specified, the distinctness of image is measured with a commercially available Rhopoint Gloss Meter.

The glass-based articles may be characterized by a sparkle effect when utilized with a display. The sparkle effect may be quantified by a pixel power deviation (PPD) measurement. The PPD measurement is dependent on the pixels per inch (ppi) value of the display utilized to perform the measurement. The PPD measurements may be performed with a SMS-1000 Sparkle Measurement System, with the display utilized in the measurement of 140 ppi. In embodiments, the glass-based article may have a PPD at 140 ppi of less than or equal to 5%, such as less than or equal to 5.0%, less than or equal to 4.9%, less than or equal to 4.8%, less than or equal to 4.7%, less than or equal to 4.6%, less than or equal to 4.5%, less than or equal to 4.4%, less than or equal to 4.3%, less than or equal to 4.2%, less than or equal to 4.1%, less than or equal to 4.0%, less than or equal to 4%, less than or equal to 3.9%, less than or equal to 3.8%, less than or equal to 3.7%, less than or equal to 3.6%, less than or equal to 3.5%, less than or equal to 3.4%, less than or equal to 3.3%, less than or equal to 3.2%, less than or equal to 3.1%, less than or equal to 3.0%, less than or equal to 3%, less than or equal to 2.9%, less than or equal to 2.8%, less than or equal to 2.7%, less than or equal to 2.6%, less than or equal to 2.5%, or less. In embodiments, the glass-based article may have a PPD at 140 ppi of greater than or equal to 2% to less than or equal to 5%, such as greater than or equal to 3% to less than or equal to 4%, greater than or equal to 2.0% to less than or equal to 5.0%, greater than or equal to 2.1% to less than or equal to 4.9%, greater than or equal to 2.2% to less than or equal to 4.8%, greater than or equal to 2.3% to less than or equal to 4.7%, greater than or equal to 2.4% to less than or equal to 4.6%, greater than or equal to 2.5% to less than or equal to 4.5%, greater than or equal to 2.6% to less than or equal to 4.4%, greater than or equal to 2.7% to less than or equal to 4.3%, greater than or equal to 2.8% to less than or equal to 4.2%, greater than or equal to 2.9% to less than or equal to 4.1%, greater than or equal to 3.0% to less than or equal to 4.0%, greater than or equal to 3.1% to less than or equal to 3.9%, greater than or equal to 3.2% to less than or equal to 3.8%, greater than or equal to 3.3% to less than or equal to 3.7%, greater than or equal to 3.4% to less than or equal to 3.6%, greater than or equal to 3.5% to less than or equal to 4.0%, and any and all sub-ranges formed from any of the foregoing endpoints.

EXAMPLES

The various embodiments of glass containers with low-friction coatings will be further clarified by the following examples. The examples are illustrative in nature, and should not be understood to limit the subject matter of the present disclosure.

Example 1

The scheme of FIGS. 1A and 1B was utilized to etch only a portion of a glass slide. The glass composition was Gorilla® Glass 3 (commercially available from Corning Inc.), which is used in all examples described herein. The composition of such glass was Gorilla Glass 3 (commercially available from Corning, Inc.). Examples of Gorilla Glass compositions are described in U.S. Pat. Nos. 7,666,511; 4,483,700; and 5,674,790. A piece of pH paper was placed in the center of the glass slide for sensing any leaking that may be present. A pre-cut film made of Visqueen film or vinyl film was laminated with a roller to one side of the glass slide (over the pH paper). The laminated film on the glass slide was heated at a temperature between 100° C. and 180° C. for 15 minutes (110° C., 120° C., 130° C., 140° C., 150° C., 160° C., 180° C. and 200° C. for 15 minutes were tested respectively). Next, the laminated glass was placed into 45 wt. % sodium hydroxide at 100° C. for 4 hours, then rinsed with water and checked if there is any alkaline leaking. The pH paper did not detect a basic etchant.

Example 2

The scheme of FIGS. 2A and 2B was utilized to etch only a portion of a glass slide. A piece of 0.3-0.5 mm thickness polyethylene plastic sheeting (commercially available from Visqueen) was cut so that the perimeter of the glass slide was exposed. A silane-modified polymer adhesive (commercially available as Locite Stilk'n Seal Extreme Conditions) or a two-component epoxy glue (commercially available from Gorilla Glue) was applied around the perimeter of the glass sheet (on the major surface of the glass sheet). A piece of pH paper was placed in the center of the glass slide (over the polyethylene plastic sheeting) for sensing any leaking that may be present. A pre-cut film made of Visqueen or vinyl was laminated with a roller to one side of the glass slide (over the pH paper and the adhesive). The laminated film on the glass slide was heated at a temperature between 100° C. and 130° C. for 15 minutes to 30 minutes. Next, the laminated glass was placed into 45 wt. % sodium hydroxide at 100° C. for 4 hours, then rinsed with water and checked if there is any alkaline leaking. The pH paper did not detect a basic etchant.

Example 3

The scheme of FIGS. 3A and 3B was utilized to etch only a portion of two glass slides. Two identical glass slides were stacked on one another with a piece of 0.3-0.5 mm thickness polyethylene plastic sheeting (commercially available from Visqueen) between the sheets (cut to the same size as the glass sheets). A piece of pH paper was placed in the center of the glass slide (between the polyethylene plastic sheeting and one of the glass slides) for sensing any leaking that may be present. The edges of the glass sheets were sealed together using a silane-modified polymer adhesive (commercially available as Locite Stilk'n Seal Extreme Conditions) or a two-component epoxy glue (commercially available from Gorilla Glue). The glass slides were heated at a temperature between 100° C. and 130° C. for 15 minutes to 30 minutes. Next, the laminated glass was placed into 45 wt. % sodium hydroxide at 100° C. for 4 hours, then rinsed with water and checked if there is any alkaline leaking. The pH paper did not detect a basic etchant.

Example 4

The scheme of FIGS. 4A and 4B was utilized to etch only a portion of two glass slides. A piece of 0.3-0.5 mm thickness polyethylene plastic sheeting (commercially available from Visqueen) was cut so that the perimeter of the glass slide was exposed. A silane-modified polymer adhesive (commercially available as Locite Stilk'n Seal Extreme Conditions) or a two-component epoxy glue (commercially available from Gorilla Glue) was applied around the perimeter of the glass sheet (on the major surface of the glass sheet). A piece of pH paper was placed in the center of the glass slide (over the polyethylene plastic sheeting) for sensing any leaking that may be present. An identical glass sheet was laminated over the initial glass sheet and adhesive. The glass slides were heated at a temperature between 100° C. and 130° C. for 15 minutes to 30 minutes. Next, the laminated glass was placed into 45 wt. % sodium hydroxide at 100° C. for 4 hours, then rinsed with water and checked if there is any alkaline leaking. The pH paper did not detect a basic etchant.

Example 5

The scheme of FIGS. 4A and 4B was utilized to etch only a portion of two glass substrates. Somatac PE911TE film (a foaming adhesive film that expands with heat) was cut into a "window" shape so as to cover the perimeter of the glass substrates. The film was laminated between the two glass substrates by pressure. Next, the laminated glass sheets were placed into 45 wt. % sodium hydroxide at 120° C. for 2 hours. After the completion of the chemical exposure, the said laminated stack was then heated to 200° C. to induce separation of the film from the two glass substrates. No etching was detected on the covered area of the glass substrates.

Example 6

The scheme of FIGS. 6A and 6B was utilized to etch only a portion of two glass substrates. Somatac PE911TE film (a foaming adhesive film that expands with heat) was cut into proximate shape of glass substrates so as to cover the perimeter of the glass substrates. The film was laminated between the two glass substrates by pressure. Next, the laminated glass sheets were placed into 45 wt. % sodium hydroxide at 120° C. for 2 hours. After the completion of the chemical exposure, the said laminated stack was then heated to 200° C. to induce separation of the film from the two glass substrates. No etching was detected on the covered area of the glass substrates.

Example 7

The scheme of FIGS. 4A and 4B was utilized to etch only a portion of two glass substrates, where no film 206 was utilized. Okamoto 1030WN film a silicon-based adherent film was cut into a "window" shape so as to cover the perimeter of the glass substrates. The film was laminated to the two glass substrates by pressure. Next, the laminated glass sheets were placed into 45 wt. % sodium hydroxide at 120° C. for 2 hours. No etching was detected on the covered area of the glass substrates. The glass substrates were separated by scribe or laser. In some samples, said laminate was separated by blowing heated air.

Example 8

The scheme of FIGS. 5A and 5B were utilized to etch only a portion of one glass substrate and one 10 mil thick polypropylene cover article. Okamoto 1030WX film (a silicone-based adherent film) was cut into a "window" shape so as to cover the perimeter of the glass substrate and polypropylene cover article. The film was laminated to the glass substrate and polypropylene cover article (a rigid sheet) by pressure. Next, the laminated glass sheet to polypropylene cover were placed into 45 wt. % sodium hydroxide at 120° C. for 2 hours. No etching was detected on the covered area of the glass substrate. The said polypropylene cover was separated clean from said Gorilla glass by peeling using heated air.

Example 9

The scheme of FIGS. 7A and 7B were utilized to etch only a portion of one glass substrate and one 10 mil thick polypropylene cover article. Okamoto 1030WD film a silicone-based adherent film was cut into proximate shape of Gorilla glass substrate so as to cover the full area of the glass substrate. The film was laminated between the glass substrate and the polypropylene sheet by pressure. Next, the laminated glass sheet to polypropylene cover were placed into 45 wt. % sodium hydroxide at 120° C. for 2 hours. No etching was detected on the covered area of the glass substrate. The said polypropylene cover was separated clean from said glass by peeling using heated air.

A white residue was detected on the film in areas that contacted the NaOH solution in the bath. It was determined by XRD that this residue was sodium silicate, which was washed away following etching.

Example 10

The scheme of FIGS. 6A and 6B was utilized to etch only a portion of two glass substrates. Okamoto 1030WN film a silicone-based adherent film covered the entire surface of one side of each glass substrate. Additional overhang of the film was present. The film was laminated to the second glass substrate by pressure. Next, the laminated glass sheets were placed into 45 wt. % sodium hydroxide at 120° C. for 2 hours. No etching was detected on the covered area of the glass substrates. The slides were separated by heating using hot air and peeling away the film.

One aspect includes a method for processing a glass-based substrate, the method comprising: applying a cover article onto a glass-based substrate such that the glass-based substrate comprises a covered surface portion and an exposed surface portion, wherein at least a portion of the covered surface portion is in direct contact with the cover article; submerging the glass-based substrate in an etchant such that the covered surface portion is not in contact with the etchant and the exposed surface portion is in direct contact with the etchant; and maintaining the submersion of the glass-based substrate in the etchant such that the etchant contacts the exposed surface portion and the cover article for a time sufficient to etch the exposed surface portion; wherein: the etchant has a pH of at least 10 and a temperature of at least 95° C. during at least a portion of the contacting of the etchant with the exposed surface portion and the cover article; and the cover article provides a barrier between the etchant and the covered surface portion for the entirety of the submerging.

Another aspect includes any of the previously disclosed aspects, wherein the cover article is applied onto the glass-based substrate such that the covered surface portion is a first major surface of the glass-based substrate, wherein the cover article is a film in contact with the entirety of the covered surface portion.

Another aspect includes any of the previously disclosed aspects, wherein the film is laminated to the entirety of the covered surface portion.

Another aspect includes any of the previously disclosed aspects, wherein the covered surface portion is the entirety of a first major surface of the glass-based article.

Another aspect includes any of the previously disclosed aspects, wherein the cover article is applied onto the glass-based substrate such that the covered surface portion is a portion of or an entirety of a first major surface of the glass-based substrate, wherein the cover article comprises an adhesive in direct contact with a perimeter portion of the covered surface portion and a film in contact with the adhesive.

Another aspect includes any of the previously disclosed aspects, wherein the cover article is applied onto the glass-based substrate such that a first major surface of the glass-based substrate is aligned and proximate to a major surface of a second glass-based substrate having a similar size as the glass-based substrate, wherein the covered surface portion comprises the first major surface of the glass-based substrate and all or a portion of the edges of the glass-based substrate, and wherein the cover article comprises a coating in contact with at least the edges of the glass-based substrate and the edges of the second glass-based substrate.

Another aspect includes any of the previously disclosed aspects, wherein the cover article further comprises a film positioned between and in contact with at least a portion of the first major surface of the glass-based substrate and at least a portion of a first major surface of the second glass-based substrate.

Another aspect includes any of the previously disclosed aspects, wherein the cover article is applied onto the glass-based substrate such that a first major surface of the glass-based substrate is aligned and proximate to a first major surface of a second glass-based substrate, wherein the covered surface portion comprises a portion of or an entirety of the first major surface of the glass-based substrate, and wherein the cover article comprises an adhesive in direct contact with a perimeter of the covered surface portion and in direct contact with the first major surface of the second glass-based substrate.

Another aspect includes any of the previously disclosed aspects, wherein the cover article further comprises a film positioned between and in contact with at least a portion of the first major surface of the glass-based substrate and at least a portion of the first major surface of the second glass-based substrate.

Another aspect includes any of the previously disclosed aspects, wherein the second glass-based substrate has a similar size as the glass-based substrate, and the adhesive is in direct contact with a perimeter portion of the first major surface of the glass-based substrate and a perimeter portion of the first major surface of the second glass-based substrate.

Another aspect includes any of the previously disclosed aspects, wherein the cover article comprises an adhesive and a rigid sheet, wherein the cover article is applied onto the glass-based substrate such that a first major surface of the glass-based substrate is aligned and proximate to a first major surface of the rigid sheet, wherein the covered surface portion comprises a portion of or an entirety of the first major surface of the glass-based substrate, and wherein the adhesive is in direct contact with a perimeter of the covered surface portion and in direct contact with the first major surface of the rigid sheet.

Another aspect includes any of the previously disclosed aspects, wherein the rigid sheet has a similar size as the glass-based substrate, and the adhesive is in direct contact with a perimeter portion of the first major surface of the glass-based substrate and a perimeter portion of the first major surface of the rigid sheet.

Another aspect includes any of the previously disclosed aspects, wherein the cover article is applied onto the glass-based substrate such that a first major surface of the glass-based substrate is aligned and proximate to a first major surface of a second glass-based substrate, and wherein the cover article comprises an adhesive in direct contact with the entirety of the covered surface portion of the glass-based substrate and in direct contact with at least a portion of the first major surface of the second glass-based substrate.

Another aspect includes any of the previously disclosed aspects, wherein the adhesive contacts the entirety of the first major surface of the glass-based substrate.

Another aspect includes any of the previously disclosed aspects, wherein the cover article comprises an adhesive and a rigid sheet, wherein the cover article is applied onto the glass-based substrate such that a first major surface of the glass-based substrate is aligned and proximate to a first major surface of the rigid sheet, and wherein the adhesive is in direct contact with the entirety of the covered surface portion and is in direct contact with at least a portion of the first major surface of the rigid sheet.

Another aspect includes any of the previously disclosed aspects, wherein the adhesive contacts the entirety of the first major surface of the glass-based substrate.

Another aspect includes any of the previously disclosed aspects, wherein the cover article comprises at least one of a film, a coating, a sheet, a tape, a paint, an adhesive, a rigid sheet, or combinations thereof.

Another aspect includes any of the previously disclosed aspects, wherein the cover article comprises one or more polymers.

Another aspect includes any of the previously disclosed aspects, wherein the polymer is a silicone, siloxane, polyimide, polyvinyl chloride, polypropylene, cyclic olefin copolymer, cyclic olefin polymer, vinyl, and polyethylene.

Another aspect includes any of the previously disclosed aspects, wherein the rigid sheet comprises polypropylene.

Another aspect includes any of the previously disclosed aspects, wherein the cover article comprise a film or adhesive having a peel strength of at least 0.2 N/25 mm.

Another aspect includes any of the previously disclosed aspects, wherein the cover article comprise a film or adhesive that is selectively de-bondable from the glass-based substrate.

Another aspect includes any of the previously disclosed aspects, wherein the film or adhesive is selectively de-bondable from the glass-based substrate by cooling.

Another aspect includes any of the previously disclosed aspects, wherein the film or adhesive is selectively de-bondable from the glass-based substrate by exposure to temperatures of less than or equal to 10° C.

Another aspect includes any of the previously disclosed aspects, wherein the film or adhesive is selectively de-bondable from the glass-based substrate by heating.

Another aspect includes any of the previously disclosed aspects, wherein the film or adhesive is selectively de-bondable from the glass-based substrate by exposure to: a temperature of at least 5° C. greater than the temperature of the etchant; or a temperature of greater than or equal to 150° C.

Another aspect includes any of the previously disclosed aspects, wherein the film or adhesive is selectively de-bondable from the glass-based substrate by exposure to UV light.

Another aspect includes any of the previously disclosed aspects, wherein the film or adhesive is selectively de-bondable from the glass-based substrate by mechanical means.

Another aspect includes any of the previously disclosed aspects, wherein a material of the film or adhesive chemically reacts with the etchant to form a product material that forms a barrier.

Another aspect includes any of the previously disclosed aspects, wherein the product material is sodium silicate formed from the reaction of a silicone-based material and NaOH.

Another aspect includes any of the previously disclosed aspects, wherein the film or adhesive comprises a foaming agent.

Another aspect includes any of the previously disclosed aspects, wherein the glass-based substrate comprises an alkali aluminosilicate glass, an alkaline earth aluminosilicate glass, or a glass ceramic.

Another aspect includes any of the previously disclosed aspects, wherein the etchant is an aqueous hydroxide solution with a hydroxide concentration of greater than or equal to 5 wt. % to less than or equal to 60 wt. %.

Another aspect includes any of the previously disclosed aspects, wherein the glass-based substrate is a sheet comprising a first major surface and a second major surface opposite the first major surface.

Another aspect includes any of the previously disclosed aspects, wherein the glass-based substrate is a glass sheet.

Another aspect includes any of the previously disclosed aspects, further comprising abrading the exposed surface portion by propelling abrasive particles against the exposed surface portion prior to etching.

Another aspect includes any of the previously disclosed aspects, wherein the time sufficient to etch the exposed surface portion is greater than or equal to 15 minutes to less than or equal to 400 minutes.

Another aspect includes any of the previously disclosed aspects, further comprising removing the cover article from the glass-based substrate following the submersion of the glass-based substrate in the etchant.

Another aspect includes any of the previously disclosed aspects, further comprising ion-exchanging the glass-based substrate with a molten salt bath following the removing of the cover article from the glass-based substrate.

Another aspect includes a glass-based substrate produced by the method of any preceding aspect, wherein the glass-based substrate comprises an etched surface portion and a non-etched surface portion.

Another aspect includes any of the previously disclosed aspects, wherein the etchant comprises NaOH, KOH, or combinations thereof.

Another aspect includes any of the previously disclosed aspects, wherein the etchant does not comprise hydrofluoric acid.

Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. As utilized herein, when the term "about" is used to modify a value, the exact value is also disclosed.

What is claimed is:

1. A method for processing a glass-based substrate, the method comprising:
    applying a cover article onto a glass-based substrate such that the glass-based substrate comprises a covered surface portion and an exposed surface portion, wherein at least a portion of the covered surface portion is in direct contact with the cover article, and wherein the cover article comprises a film that is selectively de-bondable from the glass-based substrate or an adhesive that is selectively de-bondable from the glass-based substrate;
    submerging the glass-based substrate in an etchant such that the covered surface portion is not in contact with the etchant and the exposed surface portion is in direct contact with the etchant; and
    maintaining the submersion of the glass-based substrate in the etchant such that the etchant contacts the exposed surface portion and the cover article for a time sufficient to etch the exposed surface portion;
    wherein:
    the etchant has a pH of at least 10 and a temperature of at least 95° C. during at least a portion of the contacting of the etchant with the exposed surface portion and the cover article; and
    the cover article provides a barrier between the etchant and the covered surface portion for the entirety of the submerging, wherein the film or the adhesive is selectively de-bonded from the glass-based substrate by decoupling the film or the adhesive from the glass-based substrate by thermal expansion.

2. The method of claim 1, wherein the cover article is applied onto the glass-based substrate such that the covered surface portion is a first major surface of the glass-based substrate, wherein the cover article is the film in contact with the entirety of the covered surface portion.

3. The method of claim 1, wherein the cover article is applied onto the glass-based substrate such that the covered surface portion is a portion of or an entirety of a first major surface of the glass-based substrate, wherein the cover article comprises the adhesive in direct contact with a perimeter portion of the covered surface portion and the film in contact with the adhesive.

4. The method of claim 1, wherein the cover article is applied onto the glass-based substrate such that a first major surface of the glass-based substrate is aligned and proximate to a major surface of a second glass-based substrate having a similar size as the glass-based substrate, wherein the covered surface portion comprises the first major surface of the glass-based substrate and all or a portion of the edges of the glass-based substrate, and wherein the cover article comprises the coating in contact with at least the edges of the glass-based substrate and the edges of the second glass-based substrate.

5. The method of claim 1, wherein the cover article is applied onto the glass-based substrate such that a first major surface of the glass-based substrate is aligned and proximate to a first major surface of a second glass-based substrate, wherein the covered surface portion comprises a portion of or an entirety of the first major surface of the glass-based substrate, and wherein the cover article comprises the adhesive in direct contact with a perimeter of the covered surface portion and in direct contact with the first major surface of the second glass-based substrate.

6. The method of claim 1, wherein the cover article comprises the adhesive and a rigid sheet, wherein the cover article is applied onto the glass-based substrate such that a first major surface of the glass-based substrate is aligned and proximate to a first major surface of the rigid sheet, wherein the covered surface portion comprises a portion of or an entirety of the first major surface of the glass-based substrate, and wherein the adhesive is in direct contact with a perimeter of the covered surface portion and in direct contact with the first major surface of the rigid sheet.

7. The method of claim 1, wherein the cover article is applied onto the glass-based substrate such that a first major surface of the glass-based substrate is aligned and proximate to a first major surface of a second glass-based substrate, and wherein the cover article comprises the adhesive in direct contact with the entirety of the covered surface portion of the glass-based substrate and in direct contact with at least a portion of the first major surface of the second glass-based substrate.

8. The method of claim 1, wherein the cover article comprises the adhesive and a rigid sheet, wherein the cover article is applied onto the glass-based substrate such that a first major surface of the glass-based substrate is aligned and proximate to a first major surface of the rigid sheet, and wherein the adhesive is in direct contact with the entirety of the covered surface portion and is in direct contact with at least a portion of the first major surface of the rigid sheet.

9. The method of claim 1, wherein the cover article comprises at least one of the film, a coating, a sheet, a tape, a paint, the adhesive, a rigid sheet, or combinations thereof.

10. The method of claim 1, wherein the cover article comprises one or more polymers.

11. The method of claim 1, wherein the cover article comprises the film or the adhesive having a peel strength of at least 0.2 N/25 mm.

12. The method of claim 1, wherein the film or adhesive is selectively de-bondable from the glass-based substrate by one or more of cooling, exposure to temperatures of less than or equal to 10° C., heating, exposure to a temperature of at least 5° C. greater than the temperature of the etchant, exposure to a temperature of greater than or equal to 150° C., exposure to UV light, or mechanical means.

13. The method of claim 1, wherein a material of the film or adhesive chemically reacts with the etchant to form a product material that forms a barrier.

14. The method of claim 1, wherein the film or adhesive comprises a foaming agent.

15. The method of claim 1, wherein the glass-based substrate comprises an alkali aluminosilicate glass, an alkaline earth aluminosilicate glass, or a glass ceramic.

16. The method of claim 1, wherein the etchant is an aqueous hydroxide solution with a hydroxide concentration of greater than or equal to 5 wt. % to less than or equal to 60 wt. %.

17. The method of claim 1, wherein the glass-based substrate is a glass sheet.

18. The method of claim 1, wherein the etchant comprises NaOH, KOH, or combinations thereof.

19. The method of claim 1, wherein the etchant does not comprise hydrofluoric acid.

* * * * *